United States Patent [19]
Carter et al.

[11] Patent Number: 6,019,411
[45] Date of Patent: *Feb. 1, 2000

[54] OVERHEAD WINDOW ASSEMBLY FOR VEHICLES

[75] Inventors: John W. Carter, Holland; Jeffrey A. Lewno, Hudsonville; Daniel J. Fisher, Holland; Joseph D. Rankin, III, Grand Haven, all of Mich.

[73] Assignee: Donnelly Corporation, Holland, Mich.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/895,729

[22] Filed: Jul. 17, 1997

Related U.S. Application Data

[63] Continuation of application No. 08/482,029, Jun. 7, 1995, Pat. No. 5,667,896, which is a continuation-in-part of application No. 08/420,233, Apr. 11, 1995, Pat. No. 5,853,895.

[51] Int. Cl.[7] .......................................................... B60J 1/20
[52] U.S. Cl. ........................................... 296/37.7; 296/215
[58] Field of Search ..................................... 296/211, 215, 296/216.01, 216.09, 37.1, 216.02, 37.7, 37.8, 218; 174/68.1, 68.2, 71 B, 72 B; 362/80.14; 439/34, 36, 110; 224/482, 311

[56] References Cited

U.S. PATENT DOCUMENTS 226,770 4/1880 Morse .
1,963,941 6/1934 Duffy .

(List continued on next page.)

FOREIGN PATENT DOCUMENTS 0289156 11/1988 European Pat. Off. .
0526327 2/1993 European Pat. Off. .

(List continued on next page.)

OTHER PUBLICATIONS

SAE Technical Paper Series, No. 900519: Case Study, An Encapsulated Window Program Between a U.S. Supplier and a Japanese Automobile Company: Csokasy and Jager, Feb. 26, 1990.

(List continued on next page.)

*Primary Examiner*—Dennis H. Pedder
*Attorney, Agent, or Firm*—Van Dyke, Gardner, Linn & Burlhart, LLP

[57] ABSTRACT

A modular vehicle window assembly is provided which has attached thereto interior vehicle accessories. In a preferred embodiment, the window panel assembly includes a window panel disposed within or covering a window opening formed in the vehicle. The window panel may optionally contain a conventional gasket or sealing structure to provide a weather-tight seal in the window opening. Supported on and interconnecting to the interior surface of the window panel are any one of a number of different accessory configurations, including centerline, island, and peninsular overhead consoles providing storage space, overhead lighting, and air conditioning vents for use by the occupants. Other accessories which may be used include an instrument display assembly, a control assembly, a window shade assembly, and a hand-hold assembly. The interior accessories may be interconnected to the window panel by a variety of fasteners which provide the ability to quickly interchange an interior component and/or provide sufficient tensional strength characteristics to suspend the interior accessory from the interior surface of the window panel. Also provided are a perimeter storage and concealment system for providing a finished interior and storage capability about the interior of the window opening. Preferably, the assembly is used in the roof area of the vehicle such that the accessories are supported overhead of the passenger compartment.

12 Claims, 8 Drawing Sheets

U.S. PATENT DOCUMENTS

| | | | |
|---|---|---|---|
| 2,502,970 | 4/1950 | Manning . | |
| 2,507,965 | 5/1950 | Eichner . | |
| 2,555,204 | 5/1951 | Sorrell . | |
| 2,592,411 | 4/1952 | Frohnapel . | |
| 2,608,926 | 9/1952 | Helsley . | |
| 2,617,481 | 11/1952 | Frohnapel | 160/237 |
| 2,679,201 | 5/1954 | Scharmen . | |
| 2,738,838 | 3/1956 | Sutter . | |
| 2,829,081 | 4/1958 | Sweem . | |
| 2,948,015 | 8/1960 | Hansen . | |
| 3,032,808 | 5/1962 | Fleming . | |
| 3,052,496 | 9/1962 | Frey . | |
| 3,096,061 | 7/1963 | Bertell . | |
| 3,156,415 | 11/1964 | Walker | 296/215 |
| 3,282,014 | 11/1966 | Bamford et al. | 52/627 |
| 3,343,867 | 9/1967 | Couch et al. . | |
| 3,367,616 | 2/1968 | Bausch et al. . | |
| 3,635,435 | 1/1972 | Perison, Sr. . | |
| 3,713,578 | 1/1973 | Johnson . | |
| 3,806,188 | 4/1974 | Tantlinger . | |
| 3,827,184 | 8/1974 | Pennec et al. . | |
| 3,837,984 | 9/1974 | Wagner et al. . | |
| 3,881,303 | 5/1975 | Krafka et al. . | |
| 3,885,072 | 5/1975 | Zibritosky . | |
| 3,916,055 | 10/1975 | Wagner . | |
| 4,093,304 | 6/1978 | Ziegler . | |
| 4,139,234 | 2/1979 | Morgan . | |
| 4,167,259 | 9/1979 | Bury . | |
| 4,363,191 | 12/1982 | Morgan . | |
| 4,364,214 | 12/1982 | Morgan et al. . | |
| 4,364,595 | 12/1982 | Morgan et al. . | |
| 4,396,221 | 8/1983 | Morgan et al. . | |
| 4,606,159 | 8/1986 | Kunert . | |
| 4,625,459 | 12/1986 | Warner . | |
| 4,700,525 | 10/1987 | Nieboer et al. . | |
| 4,707,591 | 11/1987 | Sprenger | 439/34 X |
| 4,712,341 | 12/1987 | Harris, Jr. et al. . | |
| 4,723,809 | 2/1988 | Kida et al. . | |
| 4,743,672 | 5/1988 | Goel | 528/44 |
| 4,761,916 | 8/1988 | Sanok et al. . | |
| 4,777,699 | 10/1988 | Hill et al. . | |
| 4,793,099 | 12/1988 | Friese et al. | 49/380 |
| 4,799,344 | 1/1989 | Francis . | |
| 4,822,656 | 4/1989 | Hutter, III . | |
| 4,841,698 | 6/1989 | Gold . | |
| 4,861,540 | 8/1989 | Nieboer et al. . | |
| 4,888,072 | 12/1989 | Ohlowforst et al. | 296/37.7 |
| 4,925,237 | 5/1990 | Böhn et al. . | |
| 4,936,533 | 6/1990 | Adams et al. . | |
| 4,951,907 | 8/1990 | Gold . | |
| 4,963,636 | 10/1990 | Mülhaupt et al. | 528/28 |
| 4,986,595 | 1/1991 | Gold | 296/201 |
| 4,995,666 | 2/1991 | Schürman | 296/216 |
| 5,050,928 | 9/1991 | Böhm et al. . | |
| 5,062,248 | 11/1991 | Kunert . | |
| 5,064,494 | 11/1991 | Duck et al. . | |
| 5,072,984 | 12/1991 | Jackson | 396/56 |
| 5,100,095 | 3/1992 | Haan et al. | 248/549 |
| 5,180,089 | 1/1993 | Suman et al. | 296/37.13 |
| 5,272,602 | 12/1993 | Sasajima et al. | 362/80.1 |
| 5,294,168 | 3/1994 | Kronbetter | 296/146.16 |
| 5,308,247 | 5/1994 | Dyrdek | 439/34 |
| 5,330,149 | 7/1994 | Haan et al. | 248/549 |
| 5,338,767 | 8/1994 | Sartelet et al. | 521/159 |
| 5,342,867 | 8/1994 | Ryan et al. | 524/101 |
| 5,390,975 | 2/1995 | Stephens | 290/218 |
| 5,443,673 | 8/1995 | Fisher et al. | 156/245 |
| 5,508,111 | 4/1996 | Schumucker | 428/423.1 |
| 5,529,655 | 6/1996 | Bravet et al. | 156/244.17 |
| 5,551,197 | 9/1996 | Repp et al. | 52/204.62 |
| 5,667,896 | 9/1997 | Carter et al. | 428/425.6 |

FOREIGN PATENT DOCUMENTS

| | | | |
|---|---|---|---|
| 3925804 | 8/1990 | Germany . | |
| 370626 | 10/1898 | Japan . | |
| 2258844 | 10/1980 | Japan . | |
| 358055347 | 4/1983 | Japan | 296/216.01 |
| 1122722 | 5/1989 | Japan . | |
| 3070626 | 3/1991 | Japan . | |
| 3236922 | 10/1991 | Japan . | |

OTHER PUBLICATIONS

SAE Technical Paper Series, No. 910758: Application of RIM Urethane to One Side of Glass for Automotive Windows; Csokasy and Kubizane, Feb. 25, 1991.

ADCO Products, Inc.: ADCO FC–1000™, Fast Curing Urethane Auto Glass Adhesive Advertisement, Technical Information, and Material Safety Data Sheet, Jun. 1994.

ADCO Products, Inc.: ADCO FC–380™, Quick Curing Urethane Auto Glass Adhesive Advertisement, Technical Information, and Material Safety Data Sheet, Jun. 1994.

Essex™: Betamate® Structural Adhesives, Testing Procedures for Prepainted Metal, Oct. 1991.

Betamate Structural Adhesive Testing CSR #87–318, Project #1C 501, Book #1206.

Essex™: Betamate® 73100–73003 Technical Bulletin, Jun. 1993.

Betamate™ Structural Adhesives: Two Component Urethanes.

ADCO™ Products, Inc., Material Safety Data Sheet, FC–1000 Urethane Sealant.

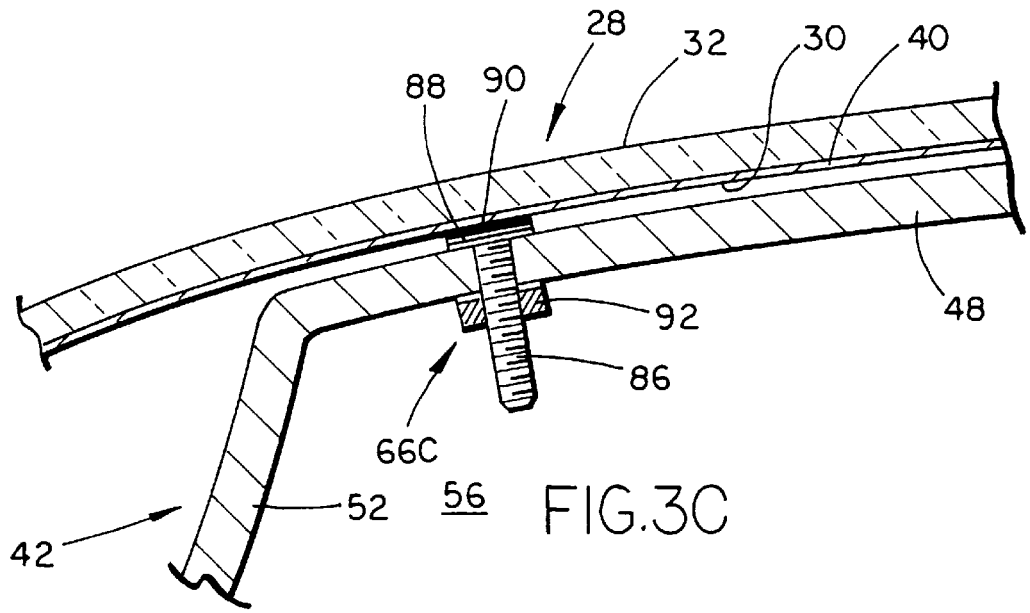
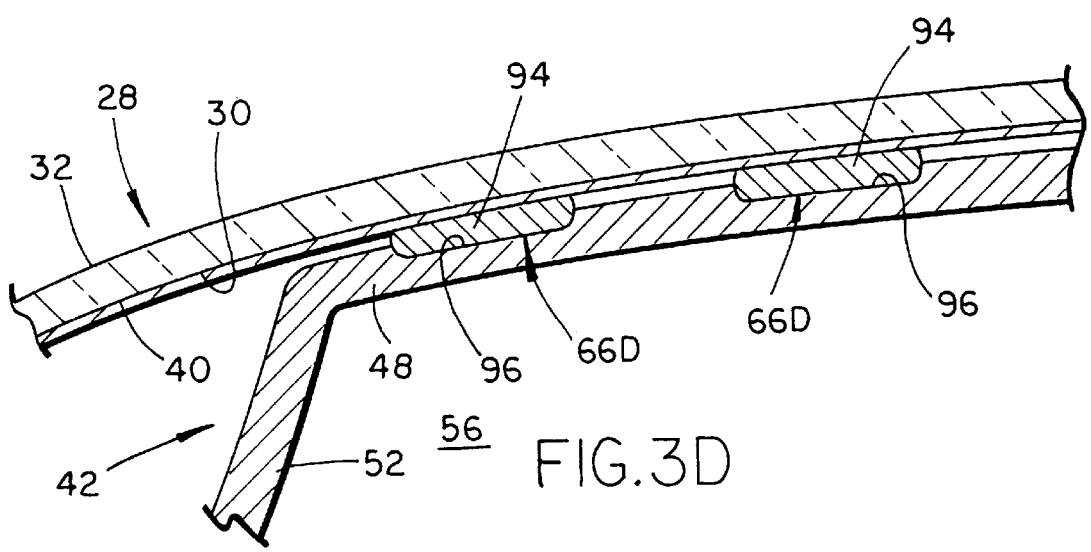
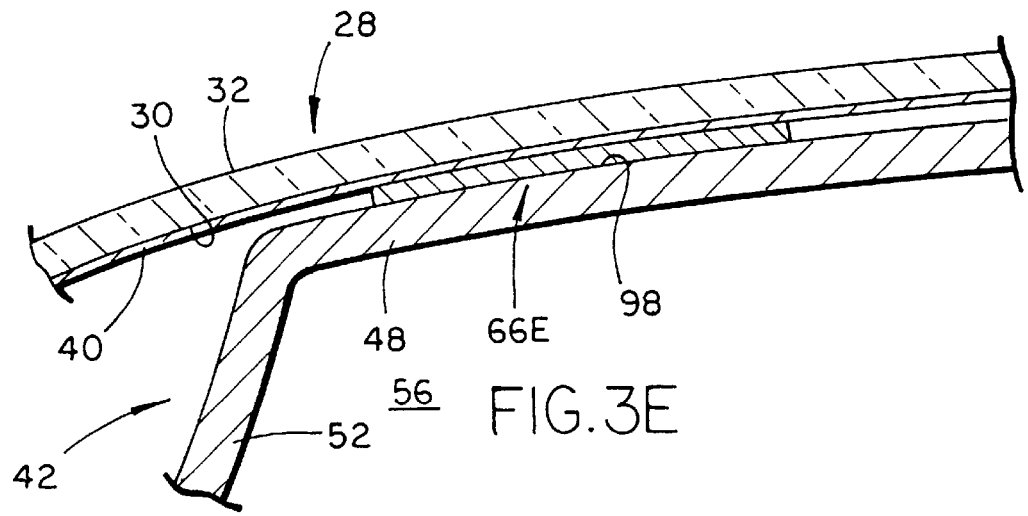

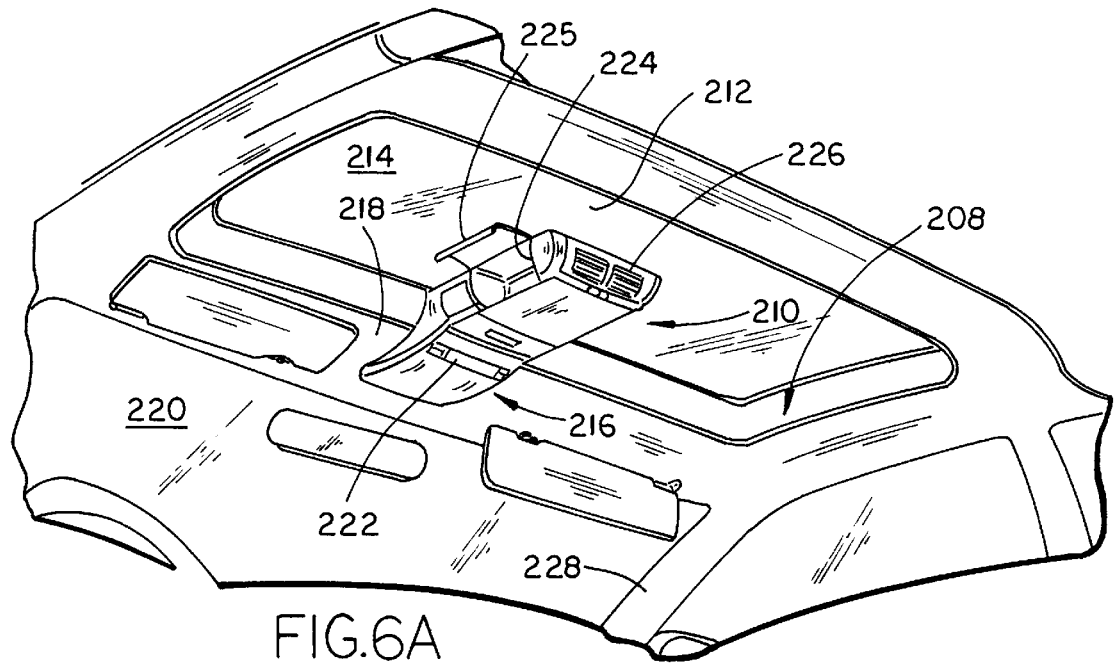
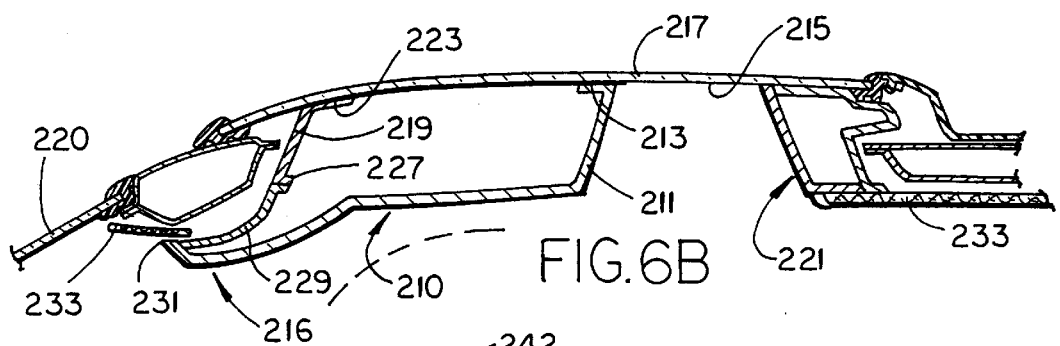
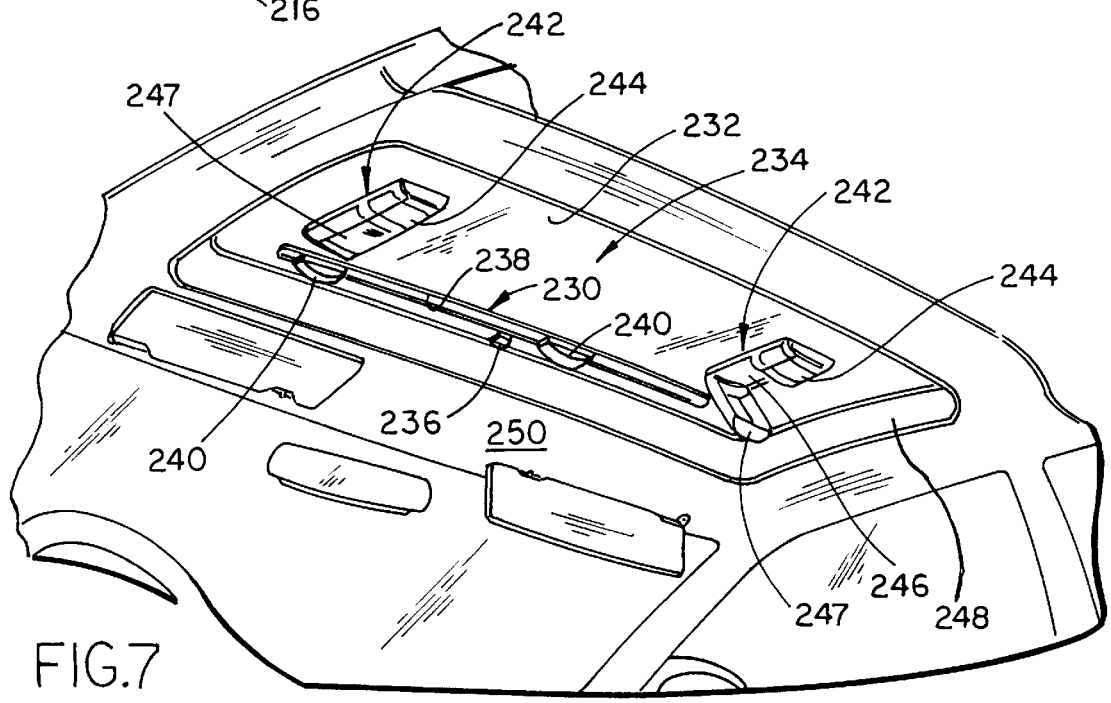

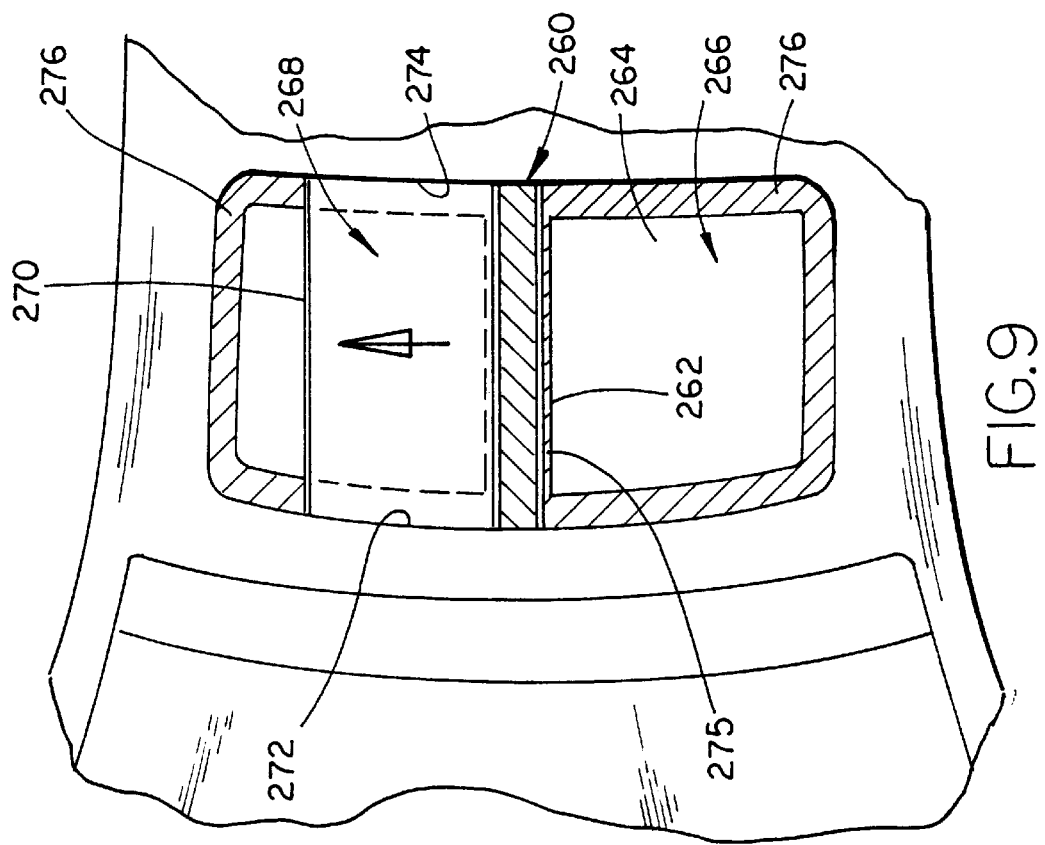
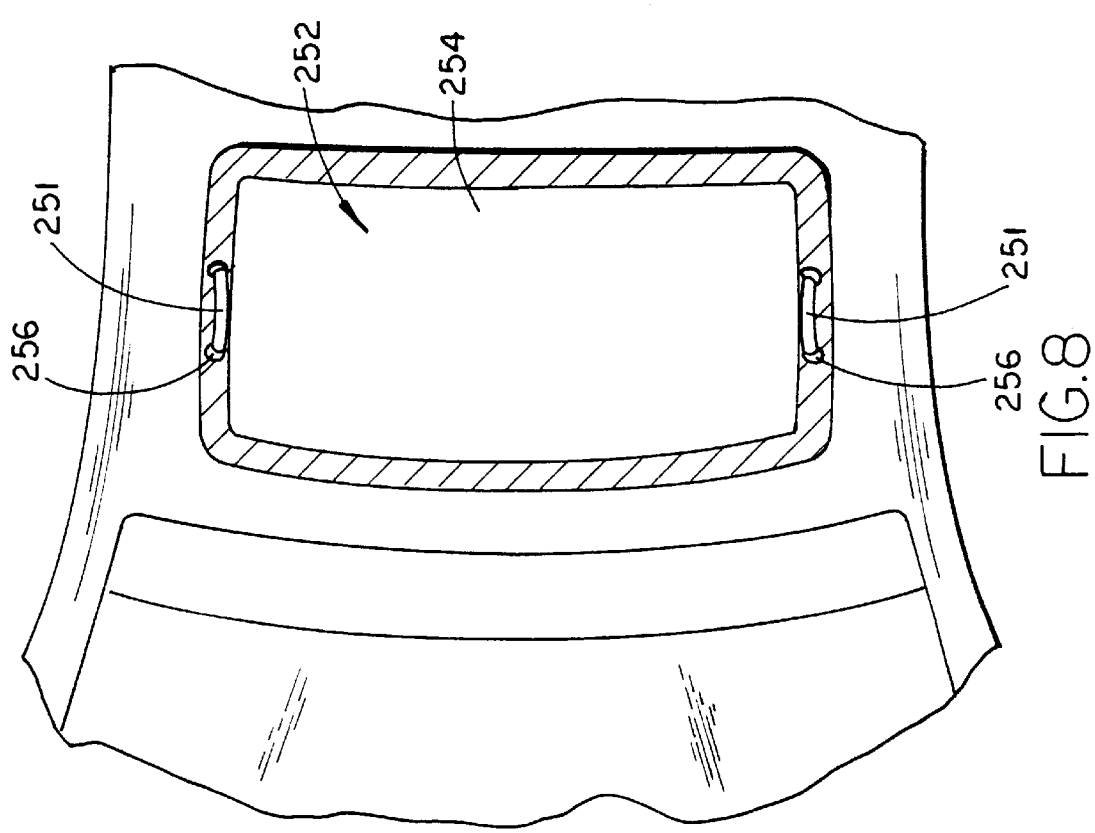

OVERHEAD WINDOW ASSEMBLY FOR VEHICLES

CROSS REFERENCE TO RELATED APPLICATIONS

This is a continuation of application Ser. No. 08/482,029, filed Jun. 7, 1995, now U.S. Pat. No. 5,667,896 which is a continuation-in-part of application Ser. No. 08/420,233, filed Apr. 11, 1995 now U.S. Pat. No. 5,853,895.

BACKGROUND OF THE INVENTION

The instant invention relates generally to vehicle accessories, and particularly to vehicle accessories attached to glass and a method for attaching such accessories to glass.

Generally speaking, vehicle interior accessories have been attached to a panel which, in turn, has been attached to some portion of the vehicle. Examples include the accessories mounted in the dashboard or instrument panel area and overhead consoles bolted to an interior roof panel. Other than the rear view mirror, accessories have not been attached to the windshield/windscreen or overhead moon roof/sun roof because there was a concern for visual impairment and because the attachment techniques often required drilling a hole through the glass to keep the accessory from falling off. As a result, overhead consoles, visors, grab handles, and the like have always been fastened to the roof cross members, pillars, interior dash and headliner panels, or specially provided members to support the accessory. These types of assemblies require additional time and expense to install in the vehicle and have not been well adapted to installation as a module or unit.

Additionally, with the current trend of producing more glass area in vehicles, space for storage or other accessories decreases at the expense of glass. Currently, there is no viable means for providing additional space for accessories or storage in the areas occupied by glass.

SUMMARY OF THE INVENTION

It is a purpose of this invention to provide a window panel assembly which can be installed in the vehicle from the vehicle exterior as a modular unit which includes one or more accessories or accessory mounting members pre-attached thereto so that the accessories are appropriately placed in or on the vehicle at the time the window panel is installed. Such an assembly is preferably shipped to the vehicle assembler as a preassembled unit, resulting in a decrease in assembly time and fewer man hours to complete the assembly which translates into a financial savings to the manufacturer.

Generally, the invention includes a window assembly having a window or transparent panel configured to close a window opening in a passenger compartment of the vehicle. The panel includes opposing surfaces. Deposited or attached to one surface of the panel in a predetermined geometric pattern is an opaque layer of material. Attached to one surface of the window panel in an area generally covered or concealed by the opaque layer are one or more accessories or accessory mounting members configured to be located on the vehicle when the panel is attached to the vehicle.

A number of attachment methods and mechanisms are provided such that the accessories may either be detachable or permanently fixed to the panel. A range of accessory options can be preassembled by the panel manufacturer and provided to the vehicle assembler as modules which can then be quickly and easily installed on the vehicle from the vehicle's exterior.

According to one form of the invention, a vehicle window panel assembly is provided, including a window panel having opposing surfaces and a geometric shape configured to fit in a window opening. An opaque layer or coating covers a predetermined area of the inner surface of the window panel. Attached to the window panel in an area generally concealed by the opaque layer is an interior accessory member configured to be attached to the inner surface of the window panel. An adhesive bonds the accessory member to the inner surface of the window panel concealed by the opaque layer.

In another form of the invention, a modular window panel assembly configured to close an overhead window opening of a vehicle is provided, including a window panel having inner and outer surfaces and of a shape configured to fit within the overhead window opening of the vehicle. An attachment member is provided which is bonded to the inner surface of the window panel. An interior accessory of the vehicle is interconnected to the inner surface of the window panel by the attachment member.

According to another form of the invention, a window panel is provided to close an opening in the vehicle. The window panel is preferably formed from a sheet of transparent material having interior and exterior surfaces terminating in a peripheral edge. At least a portion of the interior surface receives an opaque coating to conceal portions of the interior surface and provide a cosmetically appealing finish. Attached to the interior surface of the window panel having the opaque coating is an accessory preferably including at least one of a storage compartment; an overhead island, peninsula, centerline, or peripheral storage compartment; power strip; assist handle, sun visor, or shade; and retractable sunshade. The accessory is preferably fastened to the window panel by one of several attachment members, including at least one of a hook-and-loop fastener assembly, DUAL LOCK™ tape, bonded stud fastener, an adhesive, a double-sided adhesive tape, and a polymeric bead.

According to still another form of the invention, a sun visor assembly is provided which includes at least one mounting member configured to be bonded directly to the upper, inner surface of a windshield. The attachment point is preferably near the upper edge of the windshield in an area containing an opaque coating so the attachment point is concealed from the exterior of the vehicle. The mounting member is securely bonded to the opaque coating by an adhesive capable of withstanding substantial static and dynamic forces commonly associated with visor assemblies over a range of environmental conditions.

The advantages offered by this invention are numerous, including reduced assembly time by the automobile manufacturer by being able to precisely locate the accessories on the window panel which translates into a greater production rate. Additional advantages include a wide range of options using substantially uniform or universal attachment procedures, and the ability to support accessories on a window panel without using fasteners extending through the window resulting in a significant reduction in window breakage. Further, use of the invention allows the inclusion of larger window or sun/moon roof areas without sacrificing the inclusion of improved storage, instrument, grab handle, or sunshade or visor support areas. Additionally, this invention provides those added accessories in the areas occupied by the vehicle glass.

BRIEF DESCRIPTION OF THE DRAWING FIGURES

A better understanding of the invention and the advantages provided thereby may be obtained by reference to the specification and the attached drawing figures, wherein:

FIG. 1 is a top plan view of the exterior of a vehicle embodying the invention;

FIGS. 2A, 2B, and 2C are perspective, top plan, and sectional views, respectively, of the interior roof area of a vehicle illustrating one embodiment of the invention;

FIGS. 3A, 3B, 3C, 3D, and 3E are fragmentary sectional views of the interior roof area of a vehicle illustrating alternate embodiments of attachment members used in the invention;

FIGS. 4A, 4B, and 4C are perspective, sectional, and top plan views, respectively, of the interior roof area of a vehicle generally illustrating an alternate embodiment of the invention;

FIGS. 5A, 5B, and 5C are perspective, sectional, and top plan views, respectively, of the interior roof area of a vehicle generally illustrating a second alternate embodiment of the invention;

FIGS. 6A, 6B, 7, 8, and 9 are perspective or plan views of the interior roof area of a vehicle generally illustrating additional embodiments of the invention; and FIGS. 10 and 11 generally illustrate yet another embodiment of the invention as applied to the windshield.

DETAILED DESCRIPTION OF THE PREFERRED EMBODIMENTS

Generally

Figure 1:
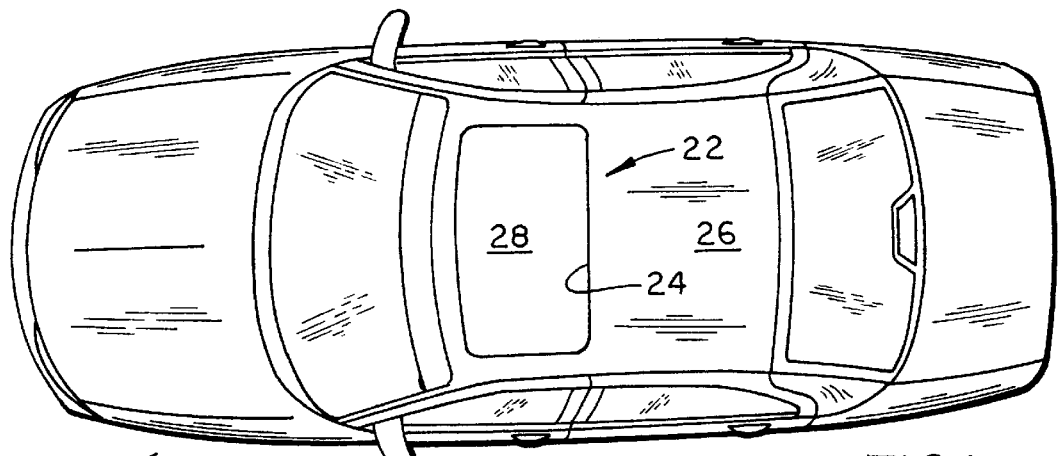

With the general trend in the auto industry to maximize visibility for the driver and occupants, window area is increasing and structural steel area is decreasing. As a result, conventional attachment points in modern vehicles for accessories above the instrument panel have also been reduced. An example of a conventional modern vehicle 20 reflecting this trend is shown in FIG. 1.

Referring to FIGS. 1, 2A, 2B, and 2C, one embodiment of a window panel assembly 22 of this invention is shown on a roof 26 of the vehicle 20. The window panel assembly 22 generally includes at least one sheet or panel 28 of glass, plastic, or composite laminate of a thickness and shape configured to be received within or over the window opening 24 formed in the roof 26. Although roof opening 24 is shown as a generally rectangular shape located in the forward section of the roof with its longitudinal axis transverse to the longitudinal axis of the vehicle, it is contemplated that the opening may take on any one of a number of shapes and locations including occupying the entire roof panel 26. In a preferred embodiment, the window panel 28 includes an inner surface 30 and an opposite, generally parallel outer surface 32, both terminating in a peripheral edge 34 which generally defines the geometric shape of the window panel. The panel 28 is preferably made from transparent or tinted glass which may be tempered, laminated, or otherwise strengthened using conventional techniques. Additionally, panel 28 may be curved, bent, or generally planar to conform to the desired need or application.

Figure 2A:
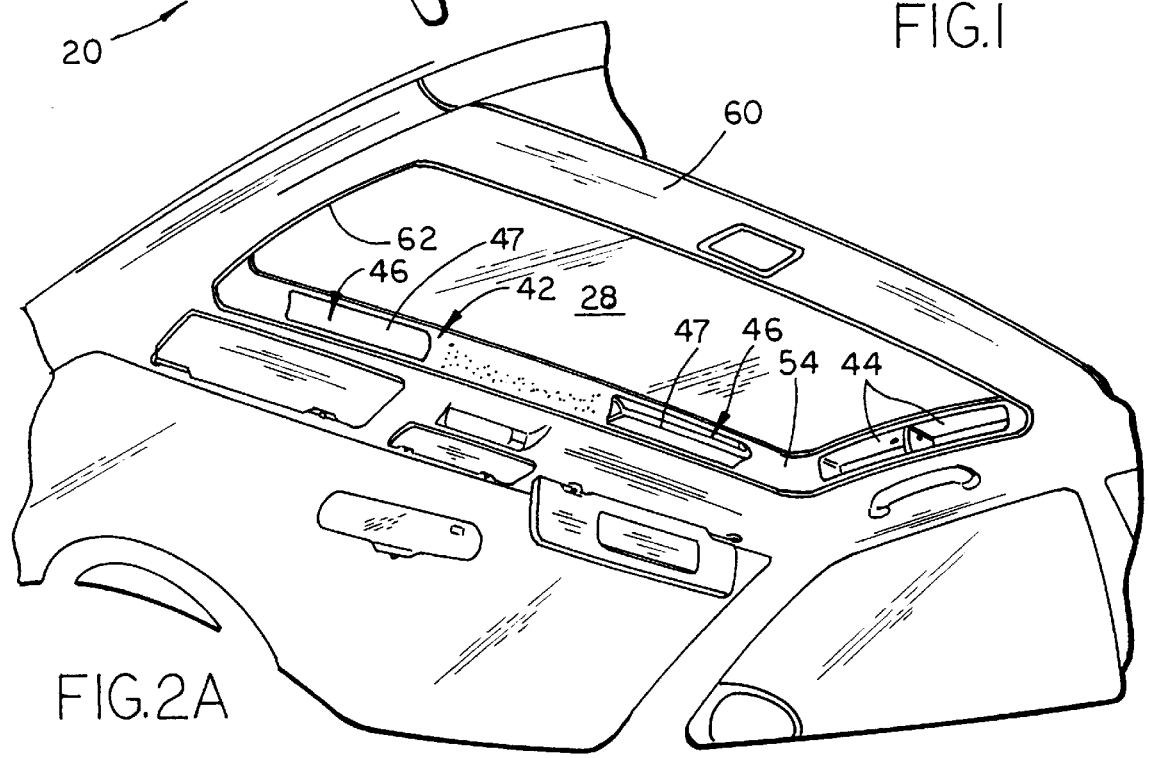
Figure 2B:
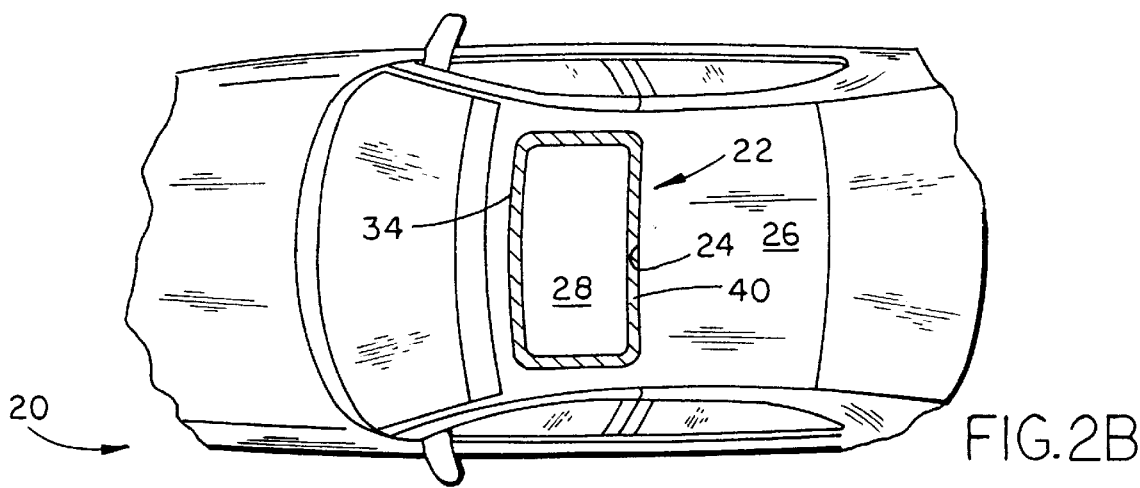
Figure 2C:
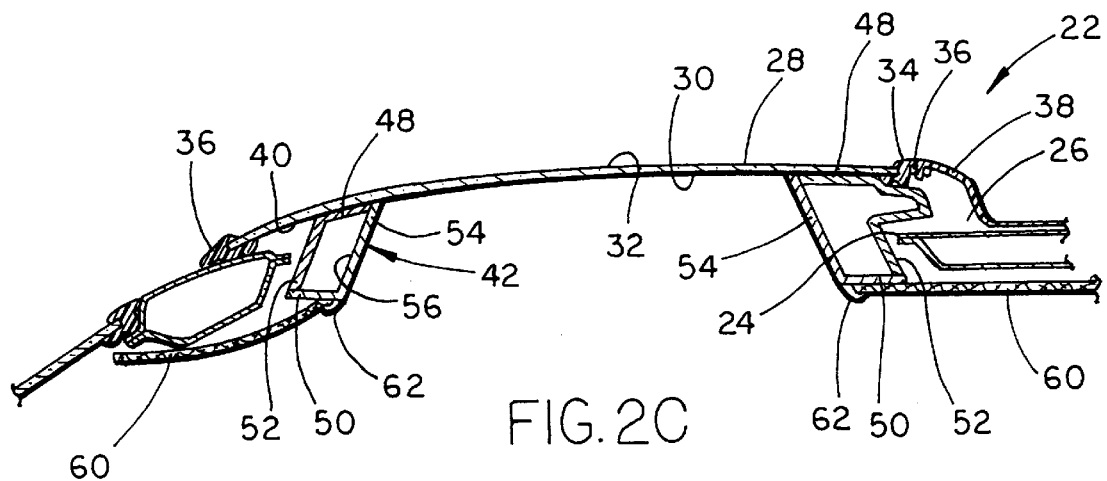

In the embodiment shown in FIG. 2C, panel 28 includes a gasket or grommet 36 attached thereto, through one of extruding or molding prior to or on the peripheral edge 34, such as disclosed in commonly owned U.S. Pat. No. 5,331,784, or deposited proximate the peripheral edge 34 along the inner surface 30 to produce a flush glazing as disclosed in commonly owned U.S. patent application Ser. No. 07/898,094, entitled VEHICULAR PANEL ASSEMBLY AND METHOD FOR MAKING SAME, filed Jun. 12, 1992, now U.S. Pat. No. 5,443,673 the hereby incorporated by reference. The gasket or grommet 36 attached to the glass helps locate and seal the window panel assembly 22 in or over the window opening 24. Although not specifically shown in the drawing figures, window panel 28 may also be attached to hinges or other mounting hardware. In the embodiment shown in FIGS. 2A–2C, the window panel 28 is disposed above and over window opening 24. The bent form of the panel produces an arched window panel wherein the edges receive a gasket 36. The trailing edge includes a cosmetically appealing trim piece 38 attached to gasket 36, such as disclosed in commonly owned U.S. Pat. No. 5,352,010.

Optionally, and preferably, deposited and fired on inner surface 30 of panel 28 is an opaque, and preferably black, frit layer or coating 40, and most preferably a ceramic frit layer, covering and concealing at least a portion of the inner surface 30. The area or pattern of the inner surface 30 which receives opaque coating 40 will generally include a region from peripheral edge 34 inward, such as two or more inches, to conceal from the exterior any adhesive or mounting member attaching window panel 28 to the vehicle (FIG. 2B). Since ceramic frit coating 40 includes a pigment of a desired color, preferably a dark tint such as black or the like, the layer results in a permanent, second, or inside surface coloration of the panel 28. When viewed from the opposite or outer surface 32, the transparent thickness of the panel colored and backed by the tinted ceramic frit layer 40, provides an appearance of depth and richness which blends well with the surrounding painted or glass areas of the vehicle. One ceramic material used to form the opaque black, ceramic frit coating 40 is manufactured by CERDEC CORPORATION—DRAKENFELD PRODUCTS located in Washington, Pa.

Accessories

As shown in the Figures, attached to the inner surface 30 of panel 28 is an accessory, in this case a storage compartment 42. Although a storage compartment is shown, an accessory can include other structures, including objects or devices not essential in themselves, but add to the beauty, convenience, or effectiveness of the vehicles. Examples include storage compartments, lamps, power strips, information displays, grab handles, sunvisors, interior trim components including headliners, sun shades, and the like, some of which are described in greater detail below. Referring to FIG. 2A, the footprint of the storage compartment is concealed from the exterior of the window panel by the opaque coating 40, which extends under and between compartment 42 and panel 28. The storage compartment 42 is suspended from the entire perimeter of panel 28 and may contain a number of compartments, with or without doors, such as designated by reference numerals 44 and 46, respectively. As seen in FIG. 2C, storage compartment 42 includes a top wall 48 and an opposing bottom wall 50 interconnected by an outer wall 52 and an interior wall 54. Formed in interior wall 54 are openings for providing access to interior compartment 56. Shelf inserts or doors 47 may be installed in the openings as desired for access and finish (FIG. 2A). Doors 47 are pivotally mounted to fold or rotate outwardly on suitable pivots or hinges and may also include handles and latches for grasping and retaining the doors in closed positions. Attached to the exterior of bottom wall 50 (FIG. 2C) is a portion of the vehicle interior headliner 60 surrounding the opening. A lip or channel 62 depending from the innermost edge of bottom wall 50 may be configured to receive an edge of headliner 60 to support the headliner and to provide a finished edge. The remainder of the headliner 60 may be attached to the interior of the vehicle roof in a conventional manner.

Figure 3A:
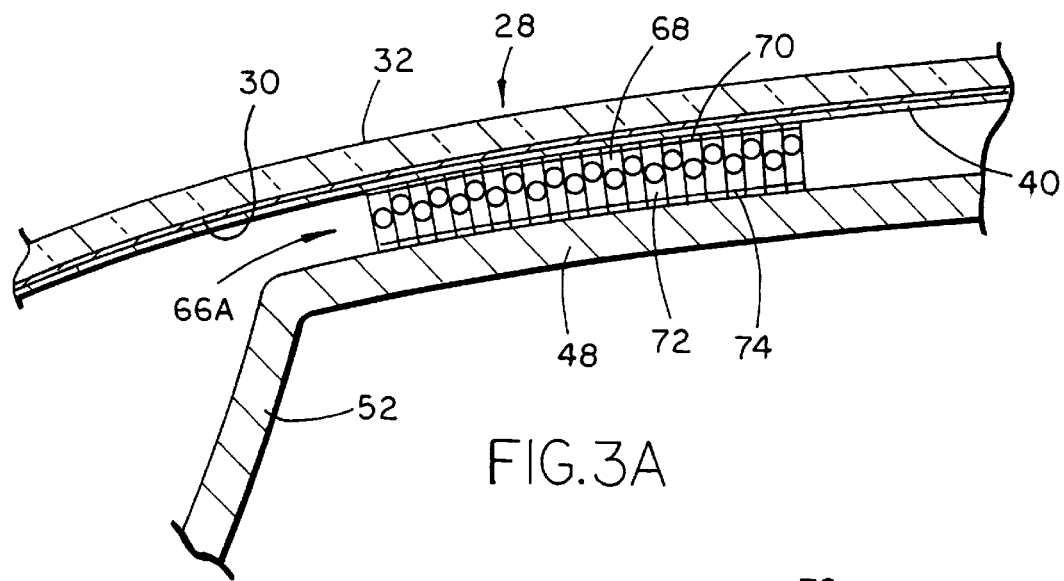

A number of fastening techniques are contemplated for attaching the storage compartment 42 to the window panel 28. The same fastening techniques may also be used to attach the headliner 60 to the compartment bottom wall 50. Referring to FIG. 3A, one embodiment 66A of attachment member is shown interconnecting the top wall 48 of the storage compartment to the inner surface 30 of the window panel 28 on opaque layer 40. In this embodiment, attachment member 66A is a hook-and-loop arrangement including a sheet of fibrous material 68 attached to opaque layer 40 by an adhesive-backed webbing 70. The fibrous material 68 is snagged or hooked by a plurality of polymeric split loops or hooks 72 extending from an adhesive-backed webbing 74 attached to the top of the storage compartment 42. An example of such a fastening material is sold under the brand name VELCRO™. In the embodiment shown in FIG. 3A, the strip of fibrous material 68 or split loops 72 has its protective backing removed to expose the adhesive and is adhered to either opaque layer 40 or the exterior of top wall 48 of the storage compartment. The cooperating, opposite half has its adhesive protective layer removed and is adhered in a corresponding pattern to the opposing surface. When mated, a sufficiently strong bond or attachment is made to suspend the storage compartment from the inner surface of window panel 28. Using this type of attachment member or fastener assembly, the storage compartment 42 may be preassembled to window panel 28 and shipped to the manufacturer who can install it substantially in or over the window opening from the exterior. If a different storage compartment configuration is desired, an exchange or substitution of compartments may be made quickly and easily.

Figure 3B:
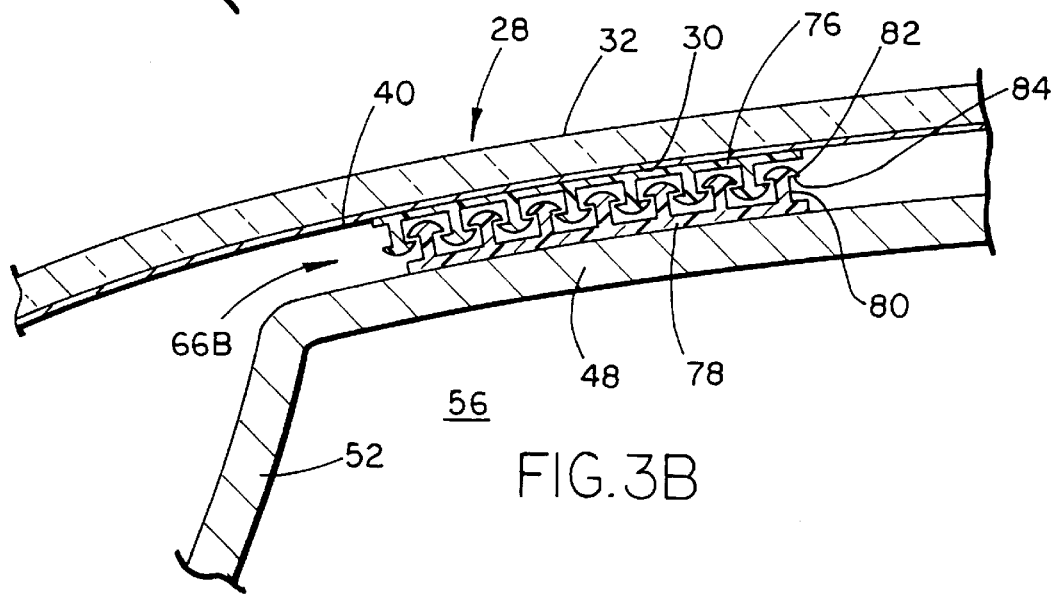

FIG. 3B illustrates another embodiment of an attachment member 66 used to interconnect the storage compartment 42 to the inner surface 30 of the window panel 28. In this embodiment, the attachment member 66B is formed from a DUAL LOCK™ brand tape manufactured by 3M Company of Minneapolis, Minn. The DUAL LOCK™ brand tape consists of two halves 76, 78 each having an adhesive backing which adheres each strip 76, 78 to one of the top wall 48 of the storage compartment 42 or the opaque layer 40 on the inner surface 30 of the window panel 28. Extending from an opposite side of the strip 76, 78 are a plurality of pins 80 each having a semi-spherical head 82 and having a flat base 84 on the underside or each head 82. With the two exposed faces of the DUAL LOCK™ tape forced together, the spherical heads 82 are forced beyond each other such that the base portions 84 of the pins engage each other and lock the two strips of tape together. The coupling of the two strips of tape is such that a straight pull or tension produced by the weight of the storage compartment will not cause the two strips of tape to separate. Rather, in order to separate the strips, one strip of tape must be peeled away from the other to cause the spherical heads to rotate and release the base portions. As with the previous embodiment, similar interacting strips of tape may be used to interconnect the bottom wall 50 of the storage compartment with the headliner 60 to retain the headliner in place about the opening.

FIG. 3C illustrates yet another embodiment 66C of the attachment member used to interconnect storage compartment 42 to interior surface 30 of window panel 28. In the embodiment shown, a metallic or polymeric post 86 may have a flange or head at one end 88 bonded to opaque layer 40 on the interior surface 30 of the window panel 28. An adhesive 90, such as disclosed below, may be used to bond flange 88 to the window panel. It is contemplated that a number of different posts may be used including Christmas tree posts, ringed posts, threaded posts, or tapered posts, each of which may receive a particular capturing member including a disk, nut, or clip, configured to be received over the post 86 and be rigidly attached thereto. Alternatively, post 86 may be a locating post. It is contemplated that a number of posts 86 will be attached in a pattern on the opaque area 40 to receive storage compartment 42 and distribute the weight about the interior of the window panel. The bond of post 86 to layer 40 of the interior of the window panel 28 provides the capability of supporting a significant amount of weight and is intended to be a more permanent structure than the embodiment using the VELCRO™ brand fastener.

FIG. 3D illustrates a more permanent installation or attachment 66D wherein one or more beads of adhesive 94 are deposited either in channels 96 formed in the exterior surface of top wall 48 or on opaque layer 40 on the inner surface of glass panel 28. With the adhesive beads in place, the storage compartment 42 is pressed against the interior surface 30 and retained in place until adhesive beads 94 form a secure bond such that window panel assembly 22 may be moved. Alternatively, an attachment member, such as a stud, clevis, post, or the like, may be attached first by the adhesive. Once cured, the vehicle accessory may be attached by the attachment member. In some instances, the attachment member may be integral with the accessory. A number of different adhesives may be suitable for attaching the mounting member or vehicle accessory to the window panel. These include moisture-activated, single component urethanes, moisture-activated silicones, thermally activated silicones, moisture-curable hot melt urethanes, thermally activated epoxies, chemically activated acrylates, thermally activated modified epoxies, two-component urethanes, and thermally activated nitrite-phenolics. The preferred adhesive is a two-component urethane described in greater detail below.

FIG. 3E illustrates yet another embodiment 66E of the attachment member for interconnecting the storage compartment to interior surface 30 of window panel 28. In this embodiment, a double-sided adhesive tape 98 may have one side adhered to opaque layer 40 on inner surface 30 of window panel 28 and the opposite surface bonded to the exterior of top wall 48. One example of a suitable double-sided tape is disclosed in U.S. Pat. No. 5,352,010.

In addition to the attachment members provided above, a polymeric bead or profile may either be post-attached, molded, or extruded onto the interior surface of the panel to provide a substrate for attaching the interior accessory. For example, a bead or profile of a thermoplastic or thermoset material may be attached to the interior surface of the panel in a number of ways including those described above. The interior accessory, such as a storage compartment, could be attached to the profile by any one of the same attachment mechanisms described above.

Figure 4A:
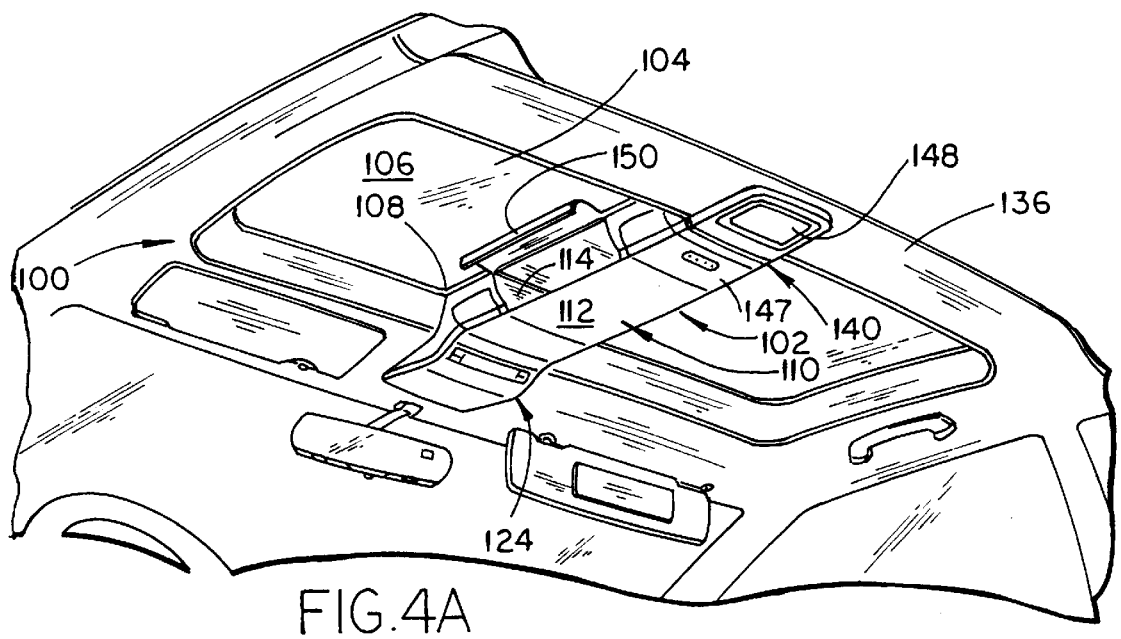
Figure 4B:
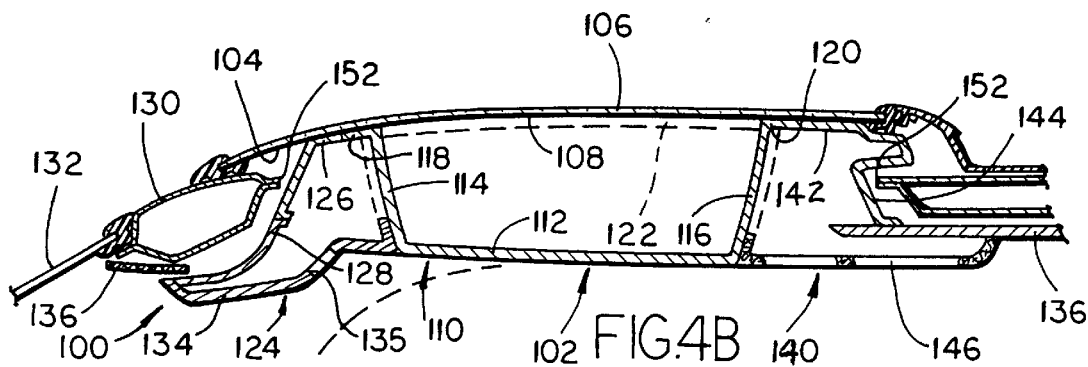
Figure 4C:
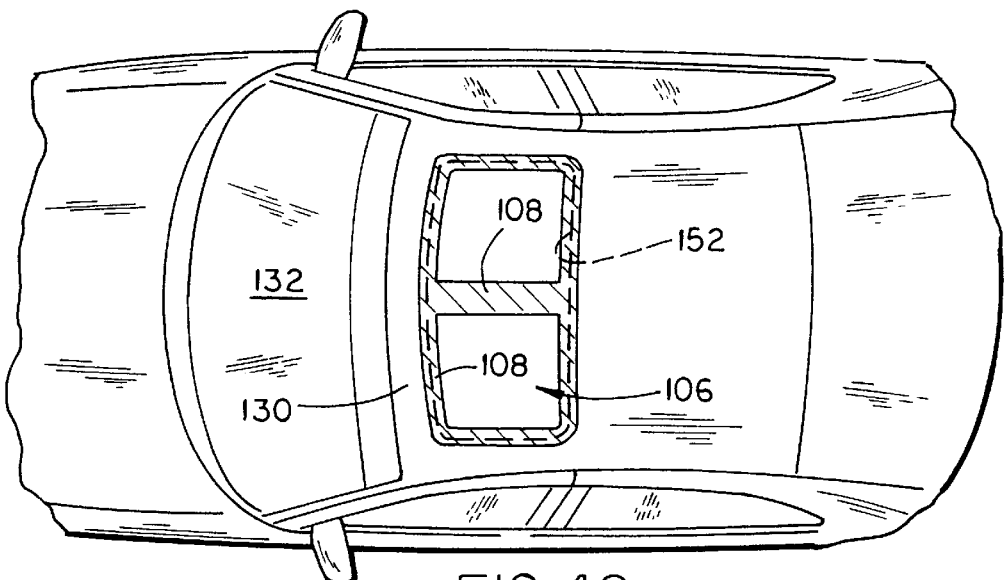

As shown in FIGS. 4A–4C, another embodiment of the window panel assembly 100 may include an overhead accessory compartment or unit 102 depending from the interior surface 104 of the window panel 106. It is preferred that console 102 be located along the centerline of the vehicle, i.e., the centerline of rectangular window panel 106 which extends transverse to the longitudinal dimension of the window. It is also preferred that the surface of console 102 adjacent window panel 106 be concealed by a band of frit coating or other opaque layer 108, such as shown in FIG. 4C. In a fashion similar to the embodiments described above, the perimeter of window panel 106 may also include the opaque layer or coating along the peripheral boarder in order to conceal the window opening from the exterior of the vehicle. Preferably the boarder coating extends continuously from the central band of layer 108.

Referring to FIGS. 4A and 4B, an overhead accessory, such as a storage compartment 102, may be manufactured in one or more sections which may be preassembled to the window panel 106 prior to installation in the vehicle or assembly may be completed in the vehicle after installation. In the embodiment shown in FIG. 4B, storage compartment 102 includes a central or middle section 110 having a bottom wall 112, a forward wall 114, and a rear wall 116. Walls 114, 116 may also terminate in flanges 118, 120, the upper surface of which may be attached by an attachment member, such as described above at 66A, 66B, 66C, 66D, or 66E, to interior surface 104 and opaque layer 108 of window panel assembly 106. Middle storage compartment 110 may also include a top wall 122, which interconnects walls 114, 116 and provides a larger surface area to be attached to the interior surface of the window panel 106 by one or more attachment members.

Disposed at the leading end of compartment 110 and abutting front wall 114 may be a forward storage compartment 124. The forward storage compartment 124 may include a top wall 126 and a forward wall 128 which extends downwardly and wraps around the bulkhead 130 at the top of the windscreen 132. From the lower leading edge of the front wall 128 is a bottom wall 134 which may contain one or more openings 135 for displays or storage compartment doors. Lower wall 134 may be rigidly or detachably fastened to forward wall 114 of middle compartment 110 using one or more attachment members 66A–66E as described above. The portion of wall 128 and 134 disposed below bulkhead 130 may be used to support that portion of headliner 136 proximate windscreen 132. The attachment member (not shown) interconnecting the forward module 124 to the interior surface of window panel 106 should provide sufficient bonding strength to support headliner 136 at this position.

Attached at the opposite end of middle compartment 110 is a rear compartment 140 which may be either an integral portion of middle compartment 110 or consist of an entirely independent compartment having an upper wall 142, a rear wall 144, and a bottom wall 146. In the embodiment shown in FIG. 4A, rear compartment 140 may contain an additional storage compartment accessible by a door 147 and may also contain an interior lighting assembly 148. Middle compartment 110 shown in FIG. 4A may also be accessible through one or more access doors 150 pivotally disposed on the sides of the compartment or may have additional access provided by doors formed in lower wall 112. Although overhead module 102 is described as consisting of three storage compartments, it is contemplated that module 102 may be formed as an integral unit and be attached to interior surface 104 of window panel assembly 106 after window panel assembly 106 has been installed in the window opening 152 (FIG. 4B).

Figure 5A:
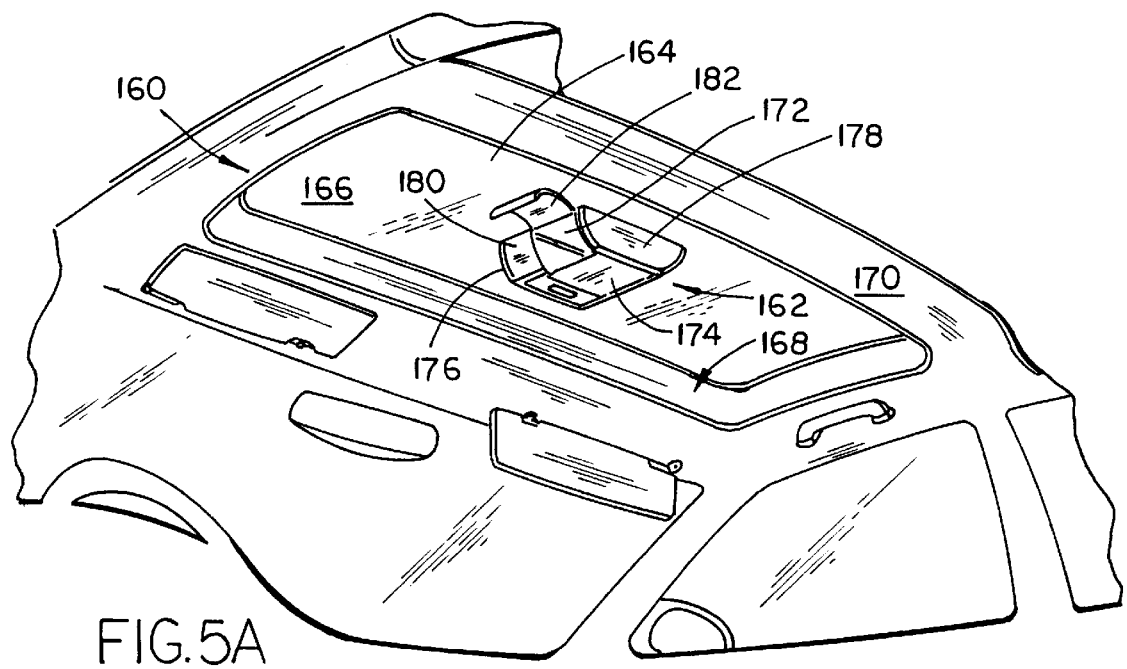
Figure 5B:
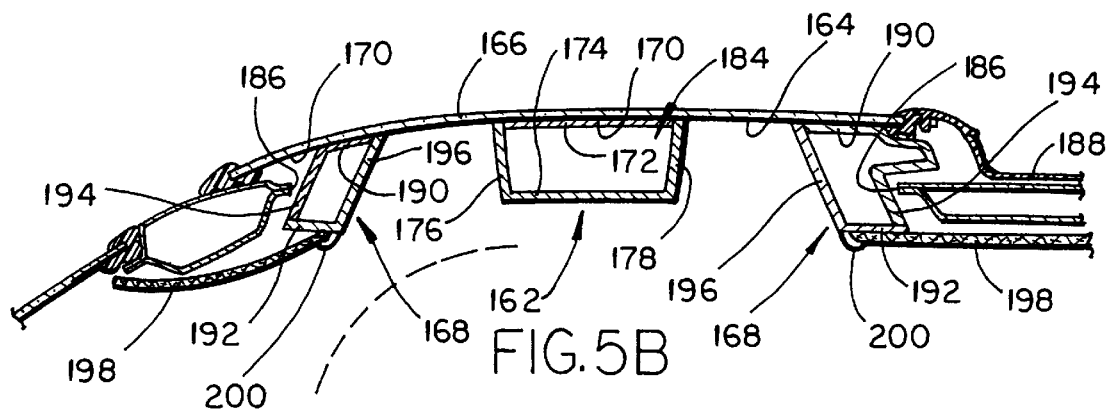
Figure 5C:
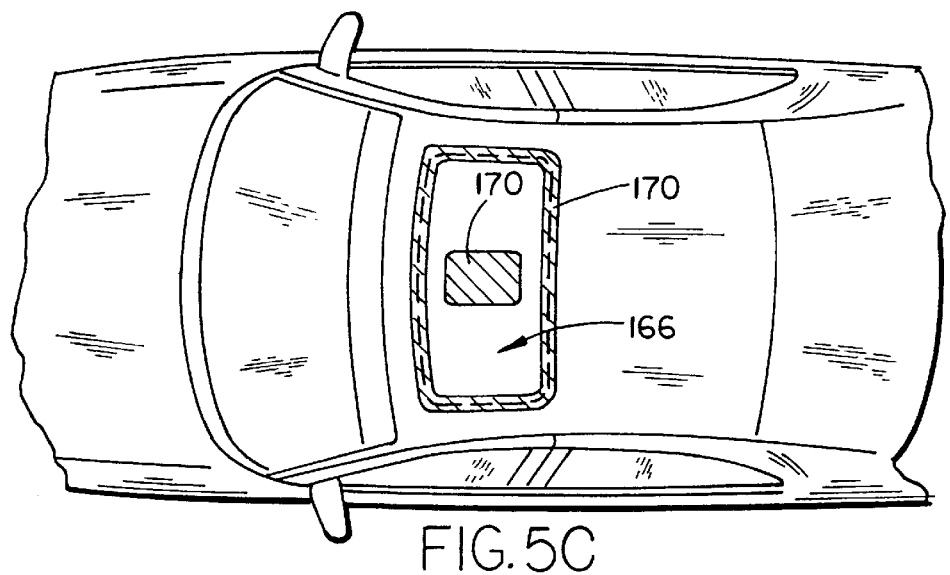

FIGS. 5A–5C illustrate yet another embodiment 160 of the invention wherein the storage compartment or accessory 162 constitutes an island suspended from the central portion of the inner surface 164 of the window panel 166. Additionally, the perimeter of the window panel 166 may have suspended therefrom a wall 168 to finish off the space between the headliner 198 and the interior surface 164 of window panel 166. Island accessory or storage compartment 162 and perimeter wall assembly 168 may be concealed from the exterior of the vehicle by a ceramic frit layer or opaque coating 170 applied to those areas of the interior surface 164 of window panel 166 wherein the accessories 162, 168 are attached (FIG. 5C).

Referring to FIGS. 5A and 5B, storage compartment or accessory 162 may include a top wall 172 and a bottom wall 174 interconnected by end walls 176, 178. Likewise, top and bottom walls and the end walls may be interconnected by lateral sidewalls 180, such as shown in FIG. 5A. Lateral sidewalls 180 or bottom wall 174 may contain one or more doors, such as pivotal or hinged doors 182, to provide access to the interior compartment 184 defined by the walls. In the island embodiment of the accessory, such as shown in FIGS. 5A–5C, upper wall 172 may be interconnected to interior surface 164 and the opaque layer 170 of window panel 166 by any one of the attachment members 66A–66E described above and shown in FIGS. 3A–3E.

Depending from the perimeter of window panel 166 and concealing window opening 186 formed in the vehicle roof 188, is a concealment or wall assembly 168. The wall or concealment 168 may be formed from one or more members having a top wall 190 and a bottom wall 192 interconnected by an outer wall 194 and an interior wall 196. The upper wall 190 may be interconnected and attached to the interior surface of window panel 166 in any one of the attachment members 66A–66E described above. Additionally, concealment 168 may contain one or more compartments, such as described above with respect to FIG. 2A. Headliner 198 also may be interconnected to the exterior surface of bottom wall 192 in a similar manner. Alternatively, a channel, finger, or similar type of projection 200 may extend from the exterior of bottom wall 192 or inner wall 196 to define a channel which is configured to receive the edge of headliner 198 surrounding the window opening.

As can be seen from the above embodiments, and particularly FIGS. 2B, 4C, and 5C, the frit layer coating or opaque layer 40, 108, 170 deposited on the interior surface of the window panel conforms substantially to the regions of the window panel which receive the accessory. This is referred to as the footprint of the accessory. The figures for the additional embodiments of the invention described below do not illustrate the particular pattern of the opaque layer or ceramic frit layer described, and it is to be understood that the concealing pattern for the coating is provided under each accessory just as in FIGS. 2B, 4C, and 5C.

Now referring to FIGS. 6–9, FIGS. 6A and 6B reveal yet another embodiment of the invention wherein an overhead peninsular console 210 is suspended from the interior surface 212 of the window panel 214 and includes a forward compartment/display section 216 which extends over the headliner 218 toward the windscreen 220. Forward compartment 216 may contain an electronic or other visual display 222, for displaying information produced by a trip computer, electronic compass, and the like. The peninsular portion of storage compartment 210 may contain a storage compartment 224 accessible through pivotal or other doors 225 and also provide a vent such as 226 for providing temperature controlled air to the rear of the vehicle. Appropriate ducting or conduit may be provided along the length of storage compartment 210, beneath headliner 218, and through the A-pillar, such as 228. Additionally, electrical power may be provided beneath the headliner and to accessory 210. A conceal 208, similar to 168 described above, may depend from the perimeter portion of window panel 214 and support the edge of headliner 218 to conceal the window opening formed in the roof of the vehicle. Additionally, conceal 208 may contain one or more compartments, such as described above with respect to FIG. 2A.

As shown in FIG. 6B, the peninsular storage compartment or console 210 may include a first portion 211 forming an exterior wall or housing having an upper flange 213 interconnected to the inner surface 215 of the window panel 217. An outer wall 219 of a concealment or perimeter storage compartment 221 may have an upper flange 223 connected to the inner surface 215 in the same manner, with a lower end 227 interconnected through an inner wall 229 to the leading edge 231 of the console 210. The leading edge 231 may also support that portion of the headliner 233. The headliner 233 may also be attached or supported by the perimeter concealment or storage compartment 221 in the same manner as described above.

In yet another embodiment of the invention, as shown in FIG. 7, a power strip 230 is attached to the interior surface 232 of the window panel 234. Power strip 230 can be arranged in a number of orientations although it is preferred that it be parallel to one of the edges of the window opening and proximate thereto such that a power cord isthmus 236 may extend thereto in a cosmetically pleasing fashion. Power strip 230 includes a channel 238 within which are received one or more electrically powered accessories 240, such as map lights and the like. Accessories 240 received within channel 238 are preferably movable to any one of a number of positions within channel 230 to suit the need of the operator in a manner like that of track lighting in buildings. Also shown in the figure, and constituting yet another embodiment of the invention, are island storage compartments generally indicated as 242 which may contain a battery operated light source, such as indicated by 244, or also contain a single storage compartment 246 accessible via a pivotal door 247 suitable to carry a pair of eyeglasses or other relatively small accessories, including an electric garage door opener. Storage compartments 242 may be located substantially anywhere along surface 232 of window panel 234. As in the previous embodiments, a conceal 248 may depend from the perimeter of window panel 234 to provide an aesthetic transition between the headliner 250 and interior surface 232 of window panel 234. Additionally, conceal 248 may contain one or more compartments, such as described above with respect to FIG. 2A.

In each of the embodiments described above that may require electrical power, such power can be provided either by a local power source, such as a battery, or by a remote power source through a conductor. Wire conductors may be concealed by the vehicle accessory and headliner, or in the case of islands, by a decorative strip. Alternatively, in the case of islands, a conductive film may be deposited or otherwise attached to the window panel. Additionally, the conductors may be sandwiched between the lamination of the window panel and exit therefrom at the appropriate location for attachment to the accessory.

FIG. 8 is a bottom plan view of yet another embodiment 250 of the window panel assembly wherein assist or grab handles 251 may be interconnected at opposite ends of the panel 252 to the interior surface 254 closest to the vehicle doors. It is contemplated that the ends 256 of the assist handles 251 may be adhesively bonded to the interior surface of the window panel. Other suitable fasteners may be devised which provide sufficient tensional load capabilities. The assist handles 251 are contemplated to be located proximate the perimeter of window panel 252, where window panel 252 is most capable of supporting any bending moments or flexural strain in the glass sheet structure. As in the previous embodiments, the ceramic frit layer or opaque coating may extend around the perimeter of the window panel in order to conceal the attachment ends or areas of the assist handles.

FIG. 9 is also a bottom plan view of a further embodiment of the invention wherein a sun shade assembly 260 includes a housing 262 interconnected to the inner surface 264 of the window panel 266 using one or more of the attachment members as described above. It is preferred that the shade mechanism 260 be disposed along a centerline of the vehicle. Extending from each side of the shade housing 262 is a retractable sun shade 268 retained within housing 262 on a rotatable roller mechanism. Each such shade 268 has a finished edge 270 which may include a guide mechanism having opposing ends captured within channels formed in the leading edge 272. Additional supports or stiffeners may be provided to retain sun shade 268 proximate window panel 266. A frictional assistance may also be provided to retain window or sun shade 268 at a desired position. Thus, the operator may extend sun shade 268 from housing 262 to any one of a number of extended positions and, when desired, may retract sun shade 268 back into housing 262. As in the prior embodiments, an opaque layer 275 may conceal the attachment location of sun shade housing 262 to window panel assembly 266. Additionally, a perimeter portion 276 of window panel 266 may be coated with the opaque layer in order to conceal the race or track for the sun shade guide.

Figure 10:
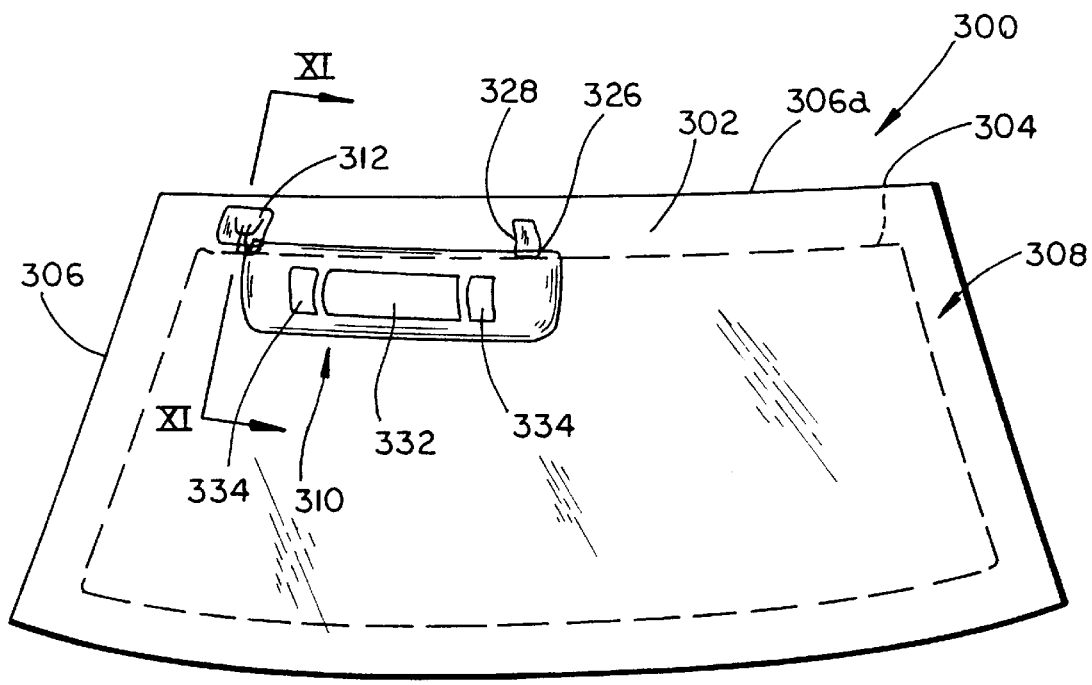
Figure 11:
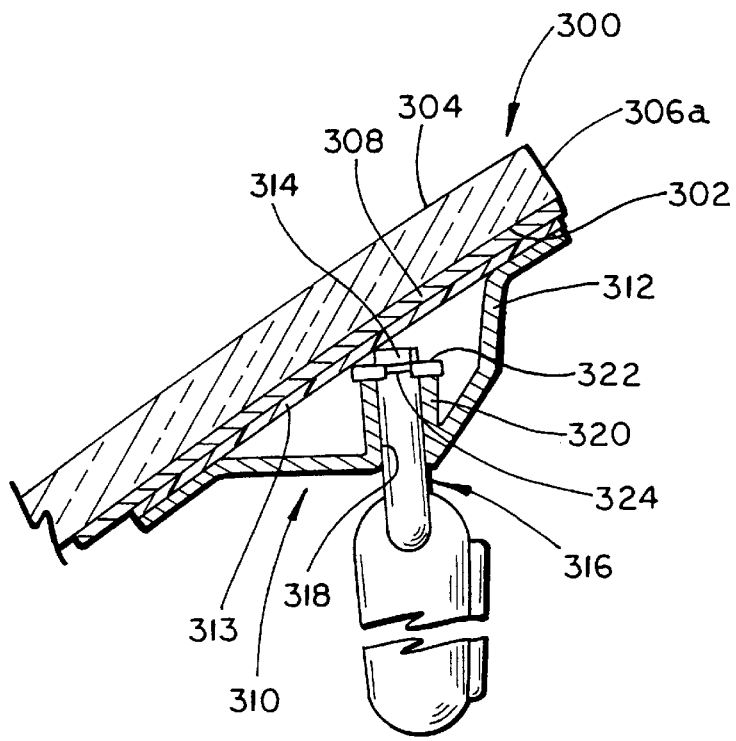

Alternatively, the concept of this invention may be used on other window panels of the vehicle, particularly in view of the trend to increase the area of glass and decrease the size of the roof size and roof pillars. Referring to FIGS. 10 and 11, a vehicle windshield 300 is shown which is made from tempered glass, plastic, or lamination of both. The window panel 300 has inner and outer surfaces 302, 304, respectively, terminating in a peripheral edge 306. As seen in FIG. 10, an upper peripheral edge, designated by reference 306a, is configured to fit in and seal the upper edge of the vehicle windshield opening. Bonded to a predetermined area of the inner surface 302 of the windshield 300 is an opaque coating or frit layer 308, as identified above. The frit coating 308 preferably occupies an area from the peripheral edge 306 inwardly about 2 to 3 inches. Attached to the inner surface 302 of the windshield 300 proximate the upper peripheral edge 306a and in the area containing the opaque coating 308, is a sun visor assembly 310. Visor assembly 310 includes at least one mounting member 312, and preferably two 312, 313, which is bonded to the opaque layer 308 at a predetermined location by an adhesive 314 described below. The adhesive is designed to securely attach the mounting members 312, 313 to the panel in such a manner so as to withstand static and dynamic loads without failing, as described below.

Mounting member 312 may have any one of a number of configurations designed to receive and retain one end 314 of a visor arm or bail 316 extending through an opening and journal sleeve 318, 320, respectively, to permit rotation of the arm 316 about end 314. Although other techniques may be used, the end 314 is generally shown to be retained within sleeve 320 by a C-clip 322 retained in a groove 324 in the bail 316. The opposite end 326 of the visor arm 316 may be received and detachably retained by a support bracket 328, also attached to the opaque layer 308 on the inner surface 302 using the same adhesive. The function and interaction of the bracket with a conventional visor is well known and will not be described with any detail herein. Similarly, the visor arm or bail 316 and visor panel 330 may also be of conventional construction and will not be described in detail other than mentioning that the visor panel 330 may include a vanity mirror 332 and lamps 334. Electrical power for the lamps may be provided by conventional wire conductors extending through a hollow arm 316 and over the windshield to the headliner or A-pillar. The exposed portion of the conductors traversing the windshield may be concealed by a decorative cover (not shown). Alternatively, electrical conductors can be made from thin film deposited on and extending across a portion of the opaque coatings to a point below or under the mounting member where they may be coupled to the electrical conductors extending from the visor assembly.

Because the visor assembly 310 is attached directly to the inflexible inner surface of the windshield, it is preferred to keep the size of the mounting members as small as possible so they do not appear obtrusive and blend with the interior of the vehicle. Also, it is desirable to reduce the visibility of any structure traversing any portion of the windshield to the visor assembly. Accordingly, a strong adhesive is required to bond the visor structure 310 to the windshield and an unobtrusive electrical connection is preferred since they may be exposed over a short distance.

Although the various embodiments of the invention described below are made with specific reference to sunroofs, moon roofs, or other window panels mounted over the passenger compartment in the roof, the basic concept can be applied to vehicle windscreens, side windows, backlights, and the like as well as other areas where it is desirable to depend a structure from a transparent or opaque, glass, plastic or laminate panel.

Adhesives

In many of the preferred embodiments described herein, the preferred adhesives are two-component urethane adhesives which are "rapid set" and "rapid cure." Rapid set refers to a property exhibited by the two-component system, such that after mixing the components and relatively promptly contacting the adhesive mixture with the objects to be bonded together, the objects are held by the adhesive against movement resulting from their own weight or movement resulting from application of a relatively slight force, within about 3 minutes or less, preferably within about 90 seconds or less, and most preferably within about 45 seconds or less from the time of mixing and application of the adhesive to the objects. "Rapid cure" refers to a cure time of less than about 60 minutes, preferably less than about 50 minutes, and most preferably less than about 40 minutes. That is, at least about 80 percent, preferably at least about 90 percent, and most preferably at least about 95 percent, of the physical characteristics of the cured adhesives are obtained within about 60 minutes from the time of achieving the set phase of the adhesive. These two-component urethanes described herein fully cure, or substantially so, within the time periods referred to for rapid cure. That is, the average molecular weight of the polyurethane chains and degree of cross-linking in the adhesive matrix does not significantly change after the period of rapid cure. A specific example of a two-component adhesive is described in copending patent application Ser. No. 08/420,233, filed Apr. 11, 1995, assigned to the assignee of this application, and incorporated herein by reference.

The rapid set, rapid cure, two-component adhesives will have numerous applications in high-production rate manufacturing processes, thereby often eliminating the requirement of fixturing components and otherwise hindering the manufacturing process. These adhesives will withstand relatively high tensile, torque, or shear loads; extreme vibration even under high temperatures and after extended aging and thermal cycling; and resistance to adverse environmental conditions encountered by vehicular window assemblies, making them appropriately suitable for use in attaching vehicle accessories to vehicle windows. The rapid set, rapid cure, two-component urethanes described herein are able to withstand tensile and shear forces of at least 500 psi, preferably 700 psi, and most preferably 800 psi, without separation from the underlying glass surface or breakage of the glass substrate. These adhesives have been found to be useful for forming bonded assemblies comprising glass and dynamic load-bearing attachment members having low surface area mounting footprints, that are able to withstand relatively high loads or other stresses, significantly beyond the ability of conventional single-component urethanes. Such low surface area mounting footprints are preferably less than about 6 $in^2$, and in some instances, may be less than about 1 $in^2$. In addition, it has surprisingly been discovered that these adhesives do not impart deleterious amounts of stress to the glass substrate to which they are bonded.

The rapid set, rapid cure, two-component urethane adhesives described herein exhibit surprising and remarkable ability to rapidly bond glass to other materials in such a manner that the resulting bond can withstand highly localized loads without failing. As previously explained, many new window designs require attachment of mounting members or other attachment members to glass which results in highly concentrated static loads and/or dynamic loads at the adhesive bond, as might be the case in certain storage compartments or hand grips. Often, there is minimal available surface area on the glass or attachment member for bonding. Such minimal surface area limits the available area for distributing these loads and stresses over the adhesive bond. It is even more remarkable that the bonded assemblies described herein, particularly those utilizing the preferred adhesives, retain their bonded configuration under high loads, while concurrently subjected to adverse conditions such as vibration and temperature extremes. It has been found that bonded assemblies utilizing the rapid set, rapid cure, two-component adhesive described herein can withstand localized static tensile loads of at least 5 $lbs/in^2$ and as high as about 40 $lbs/in^2$, and in some instances significantly higher loads such as 80 $lbs/in^2$, without failing between the original equipment manufacturer specification ranges of −40° C. to 100° C.

A wide array of materials may be bonded to glass by use of the preferred adhesives described herein. Such materials may include for example metals, coated metals, plastics, coated plastics, or composites or combinations thereof. The thickness of the adhesive layer generally depends upon the end use applications for the bonded assembly, the surface characteristics of the glass substrate and the attachment member to be bonded to the glass, and the required bond strengths. If the adhesive layer is too thick, elongation of the adhesive layer, for instance upon application of a shear stress, allows movement between the bonded components or substrates and may result in creep and/or peel. If the adhesive layer is too thin, the bonded assembly may have poor durability, insufficient squeeze out or component coverage, or other phenomena in which adhesive material migrates away from the bond interface. Moreover, if the thickness of the adhesive layer is not uniform, there may be regions on the surfaces of the bonded components that have insufficient coverage of adhesive, thereby resulting in voids or other undesirable variations in coverage. The preferred thickness for the adhesive layer is from about 0.01 mm to about 4.0 mm, more preferred being from about 0.25 mm to about 2.0 mm, and the most preferred thickness being about 0.5 mm to about 1.0 mm.

The preferred embodiment method of adhering attachment members to glass substrates is to prime the glass surface, and deposit an effective amount of a preferred embodiment adhesive described herein on one or both surfaces of the attachment member and primed glass substrate to be bonded, and place the attachment member and substrate in the desired position for bonding. The term "effective amount" refers to an amount of adhesive such that the attachment member that is adhered to the substrate is securely bonded thereto after curing of the adhesive. Typically, an effective amount is an amount that results in an adhesive layer thickness of between about 0.01 mm and about 4.0 mm, more preferably about 0.25 mm to about 2.0 mm, and most preferably from about 0.5 mm to about 1.0 mm.

Preferably, the adhesive is applied to a glass frit layer which is applied to the glass panel. Thus, in forming the glass assemblies described herein, it is preferred that the various assemblies comprise such a glass frit layer on the surface of the glass substrate. The frit layer helps to shield the adhesive applied thereto from the ultraviolet radiation of sunlight. Exemplary descriptions of forming frit layers on glass surfaces are provided in U.S. Pat. No. 5,331,784, which is incorporated herein by reference. Optionally, the surface of the glass to be bonded may be cleaned prior to bonding such as by washing with isopropyl alcohol or a suitable detergent followed by drying. Similarly, the surface of the component or other substrate to be bonded to the glass may also be washed and dried prior to bonding.

In order to form such bonds, an effective amount of the adhesive is deposited on the attachment member to be bonded, and/or to the appropriate area of the glass or frit layer at which the attachment member is to be bonded. The attachment member is then engaged with the glass or frit layer via the adhesive, and adhesive allowed to set. Upon curing, a strong, durable bond is formed between the attachment member and the glass. The preferred adhesive dispensing method is performed by using a metering unit and a mixing unit to both mix and dispense the adhesive. The metering unit should preferably dispense a very accurately controlled volume of each component to the mixing unit. This volume must be constant for a specific flow rate such that the ratio of the isocyanate component to the polyol component does not change as the total dispensed volume and flow rate change. Preferred metering units are gear pump-based dispensing units such as those supplied by $EMC^2$ of Sterling Heights, Mich. The most preferred metering units are adjustable gear pump-based units. The preferred mixing unit may be either a static mix tube or a dynamic urethane RIM mix head like those supplied by Admiral of Canton, Ohio; Cannon of Mars, Pa.; Kraus Maffai of Germany, and others. For applications involving most automotive bonded assemblies, the most preferred mixing unit is a static mix tube 0.25 inches in diameter and 6 inches long, in association with a 24 element KINEX®, a sequential reverse static mixer.

In order to promote uniformity and accuracy of dispense volume, mixing, and ratio control, it is most preferred that the isocyanate and polyol components of the adhesives described herein be delivered to the dispense metering unit and mixing unit through thermally controlled lines, such as those provided by Hart Ind. Supply of Middletown, Ohio. It is also preferred that the adhesive material be deposited upon the glass or attachment members to be adhered to the glass, with the aid of a robot. Robotic deposition or other automatic procedures promote repeatability in both application and open time control that manual operation may not be able to deliver. An example of forming a bonded vehicular glass assembly by robotic assembly is described in greater detail below. It may also be desirable to accelerate the set and cure times of the adhesive. Acceleration of adhesive set and cure times can be accomplished by heating and/or by utilizing chemical agents. The use of chemical agents is discussed in greater detail below. Acceleration by heating may be performed by induction curing, infra red heating, or other methods of heating the adhesive.

In the preferred embodiment of the two-component urethane adhesives described herein, the polyol component utilized includes one or more polyols and one or more high amine density plural amine compounds, hereinafter referred to as HADPACs. The preferred amount of HADPAC typically ranges from about 2 percent to about 20 percent, and most preferably from about 5 percent to about 10 percent by weight of the polyol component. In addition, the adhesives utilize a filler agent in either the polyol component, the isocyanate component, or both. The filler agent is preferably utilized in an amount from about 15 percent to about 50 percent of the total weight of the polyol and isocyanate components. Moreover, the adhesives preferably utilize a particular ratio of isocyanate functionality to hydroxy and/or amino functionality of from about 0.9 to about 2.0, more preferably from about 1.03 to about 1.4, and most preferably from about 1.1 to about 1.3.

A HADPAC (a high amine density plural amine compound) may be either aromatic or nonaromatic, having an amine to carbon ratio of from about 1.0 to about 0.25:1 with the provisos that the compound (a) contain at least 3 amine groups, except if the compound is aromatic, then the compound may contain as few as 2 amine groups due to plate-like stacking phenomenon and (b) the compound contain from 2 to 24 carbon atoms. The molecular weight range for these amines typically ranges from about 115 to about 5000, and more preferably from about 210 to about 290. A particularly preferred HADPAC is a penta-amine or hexamine containing 11 or 12 carbon atoms, such as the aminated reaction product of pentaerythritol, glucose, or sucrose. The most preferred HADPAC is aminated sucrose or aminated pentaerythritol. The amination reaction may be performed by reacting pentaerythritol, glucose, or sucrose, with an excess of, for example, but not limited to, ammonia, methyl amine, ethyl amine, and other amino alkanes of the formula $C_xH_nNH_2$ where x ranges from about 1 to about 20, and n is such that the alkane is fully saturated. In a preferred embodiment, x is from about 1 to about 6, and most preferably, from about 1 to about 3.

As will be appreciated by those skilled in the art, during formation and isolation of a HADPAC, there will typically be a distribution of compounds accompanying the HADPAC. Thus, it is recognized that the function of the HADPAC in the adhesives described herein stems from not only from the HADPAC, but also from the distribution of related compounds accompanying the HADPAC.

Although not wishing to be bound to any particular theory, it is believed that upon curing of the adhesives described herein, cross-linking occurs between the HADPACs, and isocyanate groups to a degree such that a higher cross-link density is achieved in the preferred embodiment adhesives as compared to most other urethane adhesives. The polyols in the polyol component may include polyols such as diols, triols, tetrols, pentols, hexols, heptols, and octols. Examples of polyol compounds that may be employed in the polyol component include, but are not limited to, propylene glycol, ethylene glycol, glycerine, trimethylolpropane, 1,2,6-hexanetriol, pentaerythritol, methyl glucoside, sorbitol, and sucrose. It is envisioned that a wide array of polyalkylene glycols (ethylene, diethylene, dipropylene), various glycerine triols and trimethylol propanes, and derivatives thereof could be utilized. Other preferred polyols include polyether or polyester polyols with hydroxyl equivalent weights (hydroxyl equivalent weight is the molecular weight per hydroxyl group in the compound) of between about 50 and about 2000, such as a blend of diols, triols, and pentols and sucrose initiated polyols. For end use applications expected to be exposed to water or moisture, polyether polyols are especially preferred in view of their relatively high degree of hydrolytic stability.

In addition to the previously noted preferred HADPAC, other amines may be utilized in the polyol component. Such amines may be formed by reaction between propylene oxide and/or ethylene oxide, and amine compounds or other nitrogen-containing compounds such as ammonia. Examples of suitable amine compounds for such reactions include, but are not limited to, triethanol amine, ethylene diamine, toluene diamine, diphenylmethane diamine, diethylenetriamine, aniline, methyldiethanolamine, triethanolamine, trispropanolamine, diethyl toluelene diamine, and other alkyl amines.

Examples of the isocyanate compounds that may be utilized in the isocyanate component include, but are not limited to, diphenylmethane diisocyanate (MDI), typically polymeric MDI, and its isomers such as 4,4'-MDI, 2,4'-MDI and 2,2'-MDI; and tolylene diisocyanate (TDI) and its isomers. It is also possible to use other isocyanates, either alone or in combination with one or both MDI and TDI. The preferred combination of isocyanates for the isocyanate component is a majority fraction of MDI prepolymers, such as Dow Chemical's PAPI® 27, and minority fraction of monomeric isocyanates, having an iso-equivalent weight between 143 and 181 (iso-equivalent weight is the molecular weight per isocyanate group in the compound), and minority fraction of a mixture of polymeric isocyanates such as a polymeric polyisocyanate available from Dow Chemical, dimers and trimers of MDI, and alternate prepolymers of MDI.

One or more filler agents are incorporated in either the polyol component, the isocyanate component, or both. Although not wishing to be bound to any particular theory, it is believed that the filler agent creates a porous structure within the adhesive, which enables moisture to permeate into and throughout the adhesive to effect isocyanate cross-linking via urea formation with any unreacted isocyanates. The preferred amount of filler agent is from about 15 percent to about 50 percent of the total weight of the polyol and isocyanate components. More preferably, the amount of filler agent is from about 20 percent to about 30 percent of the total weight of the polyol and isocyanate components. Most preferably, the amount of filler agent is about 25 percent of the total weight of the polyol and isocyanate components. Examples of suitable filler agents include, but are not limited to, silicates such as magnesium silicate, silicas such as crystalline silica and quartz silica, calcium carbonate, talc and combinations thereof. The preferred filler agent is a combination of talc and silica.

A typical urethane adhesive system employs a ratio of isocyanate functionality to hydroxy and/or amino functionality of from about 1.03 to about 1.07. A ratio higher than about 1.07 leads to an adhesive which is excessively brittle and relatively slow curing. A ratio less than about 1.03 leads to a cured adhesive which is too soft for use in most industrial applications. The preferred embodiment adhesives, it has been surprisingly discovered, utilize a ratio of isocyanate to hydroxy and/or amino functionality of from about 0.9 to about 2.0, more preferably from about 1.03 to about 1.4, and most preferably from about 1.1 to about 1.3. These ratios are desirable since by utilizing greater amounts of isocyanate, the resulting cured adhesive has greater heat resistance without sacrificing elongation or tensile strength.

A wide array of optional components may be incorporated in the preferred adhesives depending upon the application and desired end use requirements for the bonded assembly. For example, various UV blockers, stabilizers and absorbers may be incorporated in the adhesives to minimize adhesive degradation from sunlight. Chain extenders may be utilized such as ethylene glycol, butane diol, ethylene diamine, and diethyl toluene diamine. Various cross-linking agents may be utilized such as, but not limited to, oxypropionated sucrose, aliphatic amines, pentarythrathols, aminated polyols or high hydroxyl number materials such as 1,2,6-hexanetriol, 1,1,3-trimethylolpropane, and glycerine for example. In addition, pigments or colorants may be added to the adhesives. One or more diluents or thixotropic may be added to the adhesive composition to modify the viscosity and related processing characteristics of the resulting compositions. It may also be desirable that one or more additives such as thermal stabilizers, antioxidants, and surfactants may be utilized in the adhesive. All the foregoing optional components may be added to the polyol component, and where applicable, to the isocyanate component, or to both prior to mixing, or to a third or other component which can be added to the mixture prior to setting to form the desired adhesive.

Depending upon the characteristics desired for the setting and curing phases of the adhesive, it may be desirable to add one or more catalysts to accelerate the setting and curing phases. Examples of catalysts for the adhesives of the preferred embodiment include, but are not limited to, tertiary amines such as 1,4-diazabicyclo[2,2,2]octane(triethylene diamine), N-methylmorpholine, N-ethylmorpholine, triethylamine, N-methyldiethanolamine, N,N-dimethylaminoethanol, N,N-diethylaminoethanol, triethanolamine, tetramethylguanidine, N,N,N',N'-tetramethylethylenediamine, N,N-dimethyl $C_{10}$–$C_{16}$ amine, N,N-dimethylcyclohexylamine, N,N-dimethylpiperazine, 1,2,4-trimethylpiperazine, bis-(2-hydroxypropyl)-2-methylpiperazine, bis-(beta-dimethylaminoethyl)ether, and organotin compounds such as stannous octoate, stannous oleate, dibutyltin dilaurate, and dibutyltin diacetate.

There are commercially available urethane adhesives which exhibit the preferred rapid set, rapid cure, and high-strength characteristics, which provide surprisingly superior bonds between glass and other components or materials. One such commercially available two-component urethane adhesive having all the above-described properties, and which is the most preferred adhesive, is Essex 73100 isocyanate component, and either 73002 or 73003 polyol component available from Essex Specialty Products, Inc., a subsidiary of The Dow Chemical Company. The Essex 73100 isocyanate component comprises a proprietary polyurethane prepolymer(s) which is believed to primarily comprise prereacted, relatively long, branched chain molecules of diphenylmethane diisocyanate (MDI) reacted with a combination of relatively short and moderate chain length diols, triols, and moderate chain length diamines. It is further believed that the ends of these chain molecules are blocked with isocyanate groups, and there exists a proportion of free MDI molecules that are present and available for reaction. The 73100 component further comprises various fillers, such as magnesium silicate, crystalline silica, and calcium carbonate. The solids content and approximate amount of filler agents in the Essex 73100 component is about 24 percent.

The Essex 73002 polyol component comprises proprietary polyurethane prepolymer(s) of polyols, diols, N-phenol diethanolamine, and a pentaamine that is initiated from pentaerythritrol and sucrose molecule, i.e., a HADPAC. The 73002 polyol component further comprises fillers, catalysts, and likely includes surfactants. The fillers are calcium carbonate and quartz silica. The catalyst is an amine-based catalyst. The solids content and approximate amount of filler agents in the 73002 component is 27 percent.

This most preferred, commercially available adhesive system has a combination of properties and characteristics that render it particularly well suited for use in forming automotive window or panel assemblies and for installing such assemblies in vehicles. The combination of properties include relatively high stability and resistance to water, minimal creep even at relatively high temperatures thereby resulting in a structurally rigid bond, ability to impart remarkably low stress upon the underlying substrate upon curing, and as previously described, relatively fast set and cure times. The present inventor has further found that this adhesive provides surprisingly strong and durable bonds between glass and other materials. This adhesive is particularly well suited for forming bonds between vehicle mounting surfaces and attachment members that are subjected to and which bear dynamic loads.

As previously noted, it may be desirable to utilize an adhesion promotor and/or a primer. Adhesion promoting compounds generally include silanes and amino silanes such as available from Dow Corning, Lord Chemlock, General Electric and Essex. Specific examples include diamino-tri-methoxy silanes available under the designations Lord Chemlock 134/144 and similar materials from Essex such as Essex 435.18 and 435.20. Other silanes not limited to diamino or tri-methoxy forms may also be suitable. A second group of adhesion promoters are titanium or zirconium coupling agents such as available from Kenrich PetroChemical Inc. of Bayon, N.J., which enhance the bonding ability of the adhesive to the substrate. Alternatively, or in addition to an adhesion promoter, one or more primers or single-component urethane adhesives may be used such as urethane based, isocyanate-rich, moisture-curable, urethane prepolymers such as Morton Yokohama MS-90 available from Morton International of Ridgewood, Ill. or Essex 435.20a. Additional examples of substrate primers include but are not limited to Essex 435.32, for applications in which the substrate to be bonded to glass is metal or plastic. Although these adhesion promoters or primers are preferred, they are not the only adhesion promoters or primers available which may be equally if not more suitable for the application.

The adhesion promoter and/or primer applied to the glass surface should form a layer having a thickness such that the entire surface of the area of the glass to be bonded, or substantially so, is wetted by the adhesion promoter or primer. The preferred thickness range for the adhesion promoter or primer materials is from about 0.01 mils to about 3.5 mils, more preferably from about 0.05 mils to about 2 mils, and most preferably from about 0.1 mils to about 1.0 mils. It is undesirable to apply an excessive amount of adhesion promoter or primer on the glass as such leads to interlayer polymeric silane cross-linking. Such silane polymerization results in a much weaker bond than the silane-urethane primer link. Many commercial suppliers for adhesion promoters or primers recommend that after application of adhesion promoter or primer to the substrate to be bonded, that excess promoter or primer material be wiped off with a clean cloth. This wipe-off step results in additional time and labor, which is clearly undesirable at the commercial level. A more desirable way of removing excess adhesion promoter or primer material after application is to allow solvents in those materials to flash off. Sufficient flash off was found to occur at ambient temperatures in a period of only from about 5 seconds to about 15 minutes.

One or more layers of adhesion promoters and/or primers are preferably applied to the glass substrate and/or other substrates or attachment members to be bonded thereto prior to bonding. A preferred combination is to utilize an amino silane adhesion promoter, such as Essex 435.18 silane coupling agent, adjacent the glass surface, followed by a layer of a single-component urethane primer, such as Essex 435.20A primer, deposited on the layer of adhesion promoter. The adhesive is then deposited on the primer layer. It is most preferred to apply the two-component urethane adhesive to the adhesion promoter and/or primer within 96 hours of application of the adhesion promoter and/or primer to the glass surface.

The preferred embodiment bonded assemblies and panel assemblies described herein may be incorporated in vehicles such as automobiles, trucks, vans, minivans, and utility vehicles; recreational vehicles such as motor homes, campers, and trailers; other vehicles such as buses, trolleys, trains, commuter vehicles, and airplanes; marine vehicles such as boats and other watercraft; and nearly any structure utilizing a glass panel or substrate for which there exists a need to securely adhere other components to, or to securely affix one or more glass panels thereto. Such window panel assemblies are especially useful in a variety of vehicles and especially for large area windows, and particularly for large area flush-mounted glazings, such as are used as front, rear, and side windows, and as sunroofs, in automobiles, minivans, vans, trucks, and buses and which utilize a window panel that weighs at least about 3 kilograms (with a window panel weight of at least 5 kilograms common for front and rear windows, and for side windows on minivans and larger vehicles) and with a window panel area of at least about 250 square inches.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. An overhead window panel assembly for mounting in the roof area of a vehicle comprising:

an overhead window panel having an inner surface, an outer surface, and a shape configured to close an overhead window opening in the roof area of a vehicle;

an overhead vehicle interior accessory member in the form of at least one of an overhead island accessory, peninsula accessory, centerline accessory and peripheral accessory on said overhead window panel, said accessory member having an attaching surface, said attaching surface secured to said inner surface of said overhead window panel;

said attaching surface of said overhead vehicle interior accessory member being bonded to said inner surface of said overhead window panel by an adhesive, said adhesive providing a sufficiently strong bond to withstand localized static and dynamic loads acting on said accessory member without failing and being selected from the group consisting of single-component adhesives, multi-component adhesives, chemically activated adhesives, thermally activated adhesives, moisture-curable adhesives, thermoplastic adhesives, and thermoset adhesives;

said overhead vehicle interior accessory member comprising a console and being pre-attached to said inner surface of said overhead window panel prior to installation in the roof area of the vehicle.

2. An overhead window panel assembly for mounting in the roof area of a vehicle comprising:

an overhead window panel having an inner surface, an outer surface, and a shape configured to close an overhead window opening in the roof area of a vehicle;

an overhead vehicle interior accessory member in the form of at least one of an overhead island accessory, peninsula accessory, centerline accessory and peripheral accessory on said overhead window panel, said accessory member having an attaching surface, said attaching surface secured to said inner surface of said overhead window panel;

said attaching surface of said overhead vehicle interior accessory member being bonded to said inner surface of said overhead window panel by an adhesive, said adhesive providing a sufficiently strong bond to withstand localized static and dynamic loads acting on said accessory member without failing and being selected from the group consisting of single-component adhesives, multi-component adhesives, chemically activated adhesives, thermally activated adhesives, moisture-curable adhesives, thermoplastic adhesives, and thermoset adhesives;

said overhead vehicle interior accessory member comprising a console and being pre-attached to said inner surface of said overhead window panel prior to installation in the roof area of the vehicle;

said overhead window panel having a centerline; said console being located along said centerline of said overhead window panel and being suspended therefrom.

3. The overhead window panel assembly of claim 1 wherein said overhead vehicle interior accessory member comprises a compartment suspended from said overhead window panel.

4. The overhead window panel assembly of claim 1 wherein said overhead window panel comprises a glass substrate.

5. The overhead window panel assembly of claim 1 including an opaque layer covering a first area of said inner surface of said overhead window panel.

6. The overhead window panel assembly of claim 5 wherein said opaque layer has a dimension sufficient to conceal said attaching surface of said overhead vehicle interior accessory when said overhead window panel assembly is viewed from the direction of said outer surface of said overhead window panel.

7. The overhead window panel assembly of claim 5 wherein said first area of said inner surface having said opaque layer corresponds to at least a footprint of said overhead vehicle interior accessory member secured to said inner surface of said overhead window panel.

8. The overhead window panel assembly of claim 5 wherein said opaque layer comprises ceramic frit.

9. The overhead window panel assembly of claim 5 wherein said opaque area is a pattern defining at least one of an island, a peninsula, a perimeter margin, and a centerline strip traversing said inner surface of said window panel.

10. The overhead window panel assembly of claim 5 further including an adhesion-promoting compound between said opaque layer and said adhesive.

11. The overhead window panel assembly of claim 10 wherein said adhesive comprises a layer of rapid set, rapid cure, two-component urethane, said layer being cured to form a joint suitable for use on a vehicle.

12. The overhead window panel assembly of claim 11 wherein said rapid set characteristic is such that said adhesive achieves a set within a time period of about 3 minutes or less from the time of initial disposition of said adhesive between said opaque layer on said overhead window panel inner surface and said attaching surface, and wherein said rapid cure characteristic is such that said adhesive cures in a time period of less than about 60 minutes from the time of adhesive set.

* * * * *

UNITED STATES PATENT AND TRADEMARK OFFICE
CERTIFICATE OF CORRECTION

PATENT NO. : 6,019,411
DATED : February 1, 2000
INVENTOR(S) : John W. Carter Et Al.

It is certified that error appears in the above-identified patent and that said Letters Patent is hereby corrected as shown below:

The listing of inventors on the face sheet of the patent should be as follows:

--John W. Carter, Holland; Jeffrey A. Lewno, Washington; Daniel J. Fisher, West Olive; Joseph D. Rankin, III, Grand Haven, all of Mich.--

Signed and Sealed this

Fifteenth Day of May, 2001

Attest:

NICHOLAS P. GODICI

Attesting Officer

Acting Director of the United States Patent and Trademark Office